United States Patent
Yeoh et al.

(10) Patent No.: US 12,007,573 B2
(45) Date of Patent: Jun. 11, 2024

(54) DYNAMIC FIELD OF VIEW VARIABLE FOCUS DISPLAY SYSTEM

(71) Applicant: Magic Leap, Inc, Plantation, FL (US)

(72) Inventors: Ivan Li Chuen Yeoh, Tampa, FL (US); Lionel Ernest Edwin, Plantation, FL (US); Brian T. Schowengerdt, Seattle, WA (US); Michael Anthony Klug, Austin, TX (US); Jahja I. Trisnadi, Cupertino, CA (US)

(73) Assignee: Magic Leap, Inc., Plantation, FL (US)

( * ) Notice: Subject to any disclaimer, the term of this patent is extended or adjusted under 35 U.S.C. 154(b) by 482 days.

(21) Appl. No.: 17/093,784

(22) Filed: Nov. 10, 2020

(65) Prior Publication Data
US 2021/0124177 A1  Apr. 29, 2021

Related U.S. Application Data

(62) Division of application No. 15/933,297, filed on Mar. 22, 2018, now Pat. No. 10,859,812.
(Continued)

(51) Int. Cl.
*G02B 26/00* (2006.01)
*F21V 8/00* (2006.01)
(Continued)

(52) U.S. Cl.
CPC ........... *G02B 27/0179* (2013.01); *G02B 3/14* (2013.01); *G02B 6/005* (2013.01); *G02B 26/004* (2013.01);
(Continued)

(58) Field of Classification Search
CPC ........ G02B 3/14; G02B 6/005; G02B 6/0038; G02B 6/0068; G02B 26/004;
(Continued)

(56) References Cited

U.S. PATENT DOCUMENTS 5,309,272 A  5/1994  Harris
5,694,230 A  12/1997  Welch
(Continued)

FOREIGN PATENT DOCUMENTS

AU  2018240367 A1  10/2019
CA  3056924 A1  9/2018
(Continued)

OTHER PUBLICATIONS

Application No. EP18771712.9 , "Office Action", dated Nov. 11, 2022, 5 pages.
(Continued)

*Primary Examiner* — Mahidere S Sahle
(74) *Attorney, Agent, or Firm* — KILPATRICK TOWNSEND & STOCKTON LLP

(57) ABSTRACT

An augmented reality (AR) device is described with a display system configured to adjust an apparent distance between a user of the AR device and virtual content presented by the AR device. The AR device includes a first tunable lens that change shape in order to affect the position of the virtual content. Distortion of real-world content on account of the changes made to the first tunable lens is prevented by a second tunable lens that changes shape to stay substantially complementary to the optical configuration of the first tunable lens. In this way, the virtual content can be positioned at almost any distance relative to the user without degrading the view of the outside world or adding extensive bulk to the AR device. The augmented reality device can also include tunable lenses for expanding a field of view of the augmented reality device.

14 Claims, 18 Drawing Sheets

Related U.S. Application Data

(60) Provisional application No. 62/475,081, filed on Mar. 22, 2017.

(51) Int. Cl.
*G02B 3/14* (2006.01)
*G02B 27/01* (2006.01)
*G06F 3/01* (2006.01)
*G06T 5/80* (2024.01)
*G06T 19/00* (2011.01)
*G02B 27/00* (2006.01)

(52) U.S. Cl.
CPC .......... *G02B 27/0172* (2013.01); *G06F 3/011* (2013.01); *G06F 3/013* (2013.01); *G06T 5/80* (2024.01); *G06T 19/006* (2013.01); *G02B 6/0038* (2013.01); *G02B 6/0068* (2013.01); *G02B 27/0093* (2013.01); *G02B 2027/0123* (2013.01); *G02B 2027/0127* (2013.01); *G02B 2027/0185* (2013.01); *G02B 2027/0187* (2013.01)

(58) Field of Classification Search
CPC .............. G02B 26/005; G02B 27/0179; G02B 27/0172; G02B 27/0093; G02B 2027/0123; G02B 2027/0127; G02B 2027/0185; G02B 2027/0187; G06F 3/011; G06F 3/013; G06T 5/006; G06T 19/006
USPC .............................. 359/13, 15, 290, 291, 630
See application file for complete search history.

(56) References Cited

U.S. PATENT DOCUMENTS

| | | |
|---|---|---|
| 7,206,107 B2 | 4/2007 | Levola |
| 7,817,176 B2 | 10/2010 | Masuda |
| 8,248,178 B2 | 8/2012 | Lange |
| 8,817,350 B1 | 8/2014 | Robbins et al. |
| 9,335,548 B1 | 5/2016 | Cakmakci et al. |
| 9,791,700 B2 | 10/2017 | Schowengerdt |
| 10,859,812 B2 | 12/2020 | Yeoh et al. |
| 2003/0231293 A1 | 12/2003 | Blum et al. |
| 2004/0240064 A1 | 12/2004 | Dutta |
| 2007/0002447 A1 | 1/2007 | Kawasaki et al. |
| 2009/0097122 A1 | 4/2009 | Niv |
| 2011/0075257 A1 | 3/2011 | Hua et al. |
| 2012/0038987 A1 | 2/2012 | Iizuka et al. |
| 2012/0057235 A1 | 3/2012 | Chang et al. |
| 2013/0050432 A1* | 2/2013 | Perez ............... G06F 3/011 348/47 |
| 2013/0342564 A1 | 12/2013 | Kinnebrew et al. |
| 2015/0205126 A1 | 7/2015 | Schowengerdt |
| 2015/0219899 A1 | 8/2015 | Mack et al. |
| 2015/0235088 A1 | 8/2015 | Abovitz et al. |
| 2015/0309264 A1 | 10/2015 | Abovitz et al. |
| 2016/0026253 A1 | 1/2016 | Bradski et al. |
| 2016/0178910 A1 | 6/2016 | Giudicelli et al. |
| 2016/0231567 A1 | 8/2016 | Saarikko et al. |
| 2016/0231568 A1 | 8/2016 | Saarikko et al. |
| 2016/0231577 A1 | 8/2016 | Mack et al. |
| 2016/0252727 A1 | 9/2016 | Mack et al. |
| 2016/0266386 A1 | 9/2016 | Scott et al. |
| 2016/0295202 A1 | 10/2016 | Evans et al. |
| 2016/0377864 A1* | 12/2016 | Moran ............... G02C 7/101 345/8 |
| 2017/0010465 A1 | 1/2017 | Martinez et al. |
| 2017/0010488 A1 | 1/2017 | Klug et al. |
| 2017/0322418 A1 | 11/2017 | Lin et al. |
| 2018/0052276 A1 | 2/2018 | Klienman et al. |
| 2018/0113313 A1 | 4/2018 | Tekolste et al. |
| 2018/0136471 A1 | 5/2018 | Miller et al. |
| 2018/0203232 A1 | 7/2018 | Bouchier et al. |
| 2018/0275394 A1 | 9/2018 | Yeoh et al. |

FOREIGN PATENT DOCUMENTS

| | | | | |
|---|---|---|---|---|
| CN | 1131850 | A | 9/1996 | |
| CN | 1591060 | A | 3/2005 | |
| CN | 105068250 | A | 11/2015 | |
| CN | 110447082 | A | 11/2019 | |
| EP | 3602583 | A1 | 2/2020 | |
| JP | 2000298293 | A | 10/2000 | |
| JP | 2002214545 | A | 7/2002 | |
| JP | 2002214545 | A * | 7/2002 | ............. G02B 26/00 |
| JP | 2010512814 | A | 4/2010 | |
| JP | 2013047823 | A | 3/2013 | |
| JP | 2014503836 | A | 2/2014 | |
| JP | 2014505899 | A | 3/2014 | |
| JP | 2015525491 | A | 9/2015 | |
| JP | 2015528919 | A | 10/2015 | |
| JP | 2015534108 | A | 11/2015 | |
| JP | 2016502120 | A | 1/2016 | |
| JP | 2017500605 | A | 1/2017 | |
| JP | 2020514826 | A | 5/2020 | |
| KR | 20170015374 | A | 2/2017 | |
| KR | 20170020351 | A | 2/2017 | |
| KR | 20190126895 | A | 11/2019 | |
| WO | 9821612 | A1 | 5/1998 | |
| WO | 2014181419 | A1 | 11/2014 | |
| WO | 2015184409 | A1 | 12/2015 | |
| WO | 2016162606 | A1 | 10/2016 | |
| WO | 2016181108 | A1 | 11/2016 | |
| WO | 2018081305 | A1 | 5/2018 | |
| WO | 2018175780 | A1 | 9/2018 | |

OTHER PUBLICATIONS

Application No. IL269103 , "Office Action", dated Nov. 17, 2022, 4 pages.
Application No. JP2021-164535 , "Office Action" and English translation, dated Jan. 23, 2023, 17 pages.
Application No. JP2021-164535, "Office Action" and English translation, dated Aug. 2, 2022, 17 pages.
Application No. AU2018240367, "Notice of Acceptance", dated May 24, 2022, 3 pages.
Application No. KR10-2021-7025699, "Notice of Decision to Grant" and English Translation, dated May 26, 2022, 4 pages.
U.S. Appl. No. 15/793,871, "Non-Final Office Action", dated Mar. 9, 2018, 9 pages.
U.S. Appl. No. 15/793,871, "Notice of Allowance", dated Jun. 15, 2018, 7 pages.
U.S. Appl. No. 15/933,297, "Final Office Action", dated May 22, 2020, 9 pages.
U.S. Appl. No. 15/933,297, "Non-Final Office Action", dated Feb. 5, 2020, 10 pages.
U.S. Appl. No. 15/933,297, "Notice of Allowance", dated Aug. 10, 2020, 8 pages.
EP18771712.9, "Extended European Search Report", dated Jun. 29, 2020, 10 pages.
EP18771712.9, "Partial Supplementary European Search Report", dated Mar. 12, 2020, 12 pages.
PCT/US2017/058351, "International Search Report and Written Opinion", dated Mar. 5, 2018, 11 pages.
PCT/US2017/058351, "Invitation to Pay Additional Fees and Partial Search Report", dated Jan. 9, 2018, 2 pages.
PCT/US2018/023847, "International Preliminary Report on Patentability", dated Oct. 3, 2019, 7 pages.
PCT/US2018/023847, "International Search Report and Written Opinion", dated Aug. 28, 2018, 10 pages.
PCT/US2018/023847, "Invitation to Pay Additional Fees and, Where Applicable, Protest Fee", dated Jun. 14, 2018, 2 pages.
IN201947035694, "First Examination Report", dated Feb. 1, 2022, 5 pages.
Application No. KR10-2021-7025699, English Translation and Office Action, dated Nov. 11, 2021, 17 pages.

(56) References Cited

OTHER PUBLICATIONS

Australian Application No. 2018240367, First Examination Report dated May 24, 2021, 2 pages.
Chinese Application No. 201880019632.9, Office Action dated Mar. 24, 2021, 14 pages (8 pages of Original Document and 6 pages of English Translation).
Japanese Application No. 2019-551537, Office Action dated May 6, 2021, 8 pages (4 pages of Original Document and 4 pages of English Translation).
Korean Application No. 10-2019-7030559, Notice of Decision to Grant dated May 12, 2021, 3 pages (2 pages of Original Document and 1 page of English Translation).
Japanese Patent Application No. 2021-164535, "Office Action" and English translation, dated Jul. 24, 2023, 3 pages.
CN202111417985.4, "Office Action", Mar. 22, 2024, 8 pages. [no translation available].

* cited by examiner

DYNAMIC FIELD OF VIEW VARIABLE FOCUS DISPLAY SYSTEM

CROSS-REFERENCES TO RELATED APPLICATIONS

This application is a divisional of U.S. patent application Ser. No. 15/933,297 filed on Mar. 22, 2018, U.S. Pat. No. 10,859,812, issued on Dec. 8, 2020, entitled "DYNAMIC FIELD OF VIEW VARIABLE FOCUS DISPLAY SYSTEM," which is a non-provisional of and claims the benefit of and priority to U.S. Provisional Patent Application No. 62/475,081 filed on Mar. 22, 2017, entitled "DYNAMIC FIELD OF VIEW VARIABLE FOCUS DISPLAY SYSTEM," which are hereby incorporated by reference in their entirety for all purposes.

BACKGROUND OF THE INVENTION

Augmented reality devices are designed to overlay virtual content on the real world. One challenge with incorporating the virtual content naturally with real-world content is incorporating the virtual content at an apparent depth that allows the virtual content to interact with real-world objects. Otherwise, the virtual content appears more as a two-dimensional display not truly integrated into the three-dimensional real-world environment. Unfortunately, augmented reality systems capable of displaying virtual content at varying depths tend to be too large or bulky for comfortable use or are only able to display virtual content at discrete distances from a user. Another challenge with displaying virtual content to a user is that certain types of displays may have a limited field of view incapable of providing a truly immersive virtual content. For these reasons, a small form factor device capable of accurately positioning virtual content at any desired distance across an immersive field of view would be desirable.

SUMMARY OF THE INVENTION

This disclosure describes various embodiments that relate to augmented reality devices capable of accurately displaying virtual content at a desired position with respect to a user and other real-world objects within the user's field of view using tunable optics, such as tunable lenses and/or prisms. The disclosure also discusses the use of tunable lenses to expand the effective field of view of augmented reality devices.

To accomplish this, each display of an augmented reality (AR) device can include tunable lenses configured to change their optical configurations to adjust an apparent position of virtual content being presented to a user without distorting a user's view of real-world objects. A first tunable lens can be positioned between the user and a waveguide delivering the light representing the virtual content. This first tunable lens can then be reshaped to change an apparent distance between the user of the AR device and the virtual content. The second tunable lens is positioned between the user and light entering the user's eyes from real-world objects. The second tunable lens is also reshaped during operation of the AR device and the reshaping is synchronized with the reshaping of the first tunable lens so that the second tunable lens can cancel out any changes made by the first tunable lens that would degrade the user's view of real-world objects.

An optical steering component taking the form of one or more tunable prisms can also be used for expansion of the effective field of view of an augmented reality device. The tunable prism functioning as a two-dimensional optical steering device can be configured to sequentially shift light passing through the tunable prism in a series of different directions in order to expand the effective field of view of the augmented reality device. In some embodiments, the optical steering device can take the form of a liquid crystal prism capable of dynamically changing its phase profile in accordance with an electrical signal applied to the liquid crystal prism.

An augmented reality device is disclosed that includes the following: a first tunable lens; a second tunable lens; a waveguide positioned between the first tunable lens and the second tunable lens, the waveguide being configured to direct light representing virtual content through the first tunable lens and towards a user of the augmented reality device; and a processor configured to: direct the first tunable lens to change shape to alter an apparent distance between the virtual content and the user of the augmented reality device, and direct the second tunable lens to change shape to maintain apparent distances between real world objects and the user of the augmented reality device.

An augmented reality device is disclosed that includes the following: a first tunable lens; a second tunable lens; and a waveguide positioned between the first tunable lens and the second tunable lens, the waveguide including diffractive optics configured to direct light representing virtual content through the first tunable lens and towards a user of the augmented reality device. The first and second tunable lenses are configured to cooperatively change shape to adjust an apparent distance between a user of the augmented reality device and the virtual content.

A wearable display device is disclosed that includes the following: a first tunable prism; a second tunable prism; a light source configured to emit light representing virtual content; and a waveguide positioned between the first tunable prism and the second tunable prism, the waveguide including diffractive optics configured to diffract the light emitted from the light source through the first tunable prism and towards a user of the wearable display device. The first tunable prism is configured to shift at least a portion of the light received from the light source and exiting the waveguide through a peripheral region of the first tunable prism towards an eye of a user.

A wearable display device that includes: a projector; and an eyepiece comprising: one or more optical steering components. The wearable display device also includes a waveguide configured to receive and direct light from the projector through the one or more optical steering components and towards a user; an eye-gaze tracker configured to detect movement of one or both eyes of the user; and control circuitry communicatively coupled to the one or more optical steering components and the eye-gaze tracker, the control circuitry being configured to adjust an optical steering pattern of the one or more optical steering components in accordance with detected movement of one or both eyes of the user.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION OF SPECIFIC EMBODIMENTS

Figure 1:
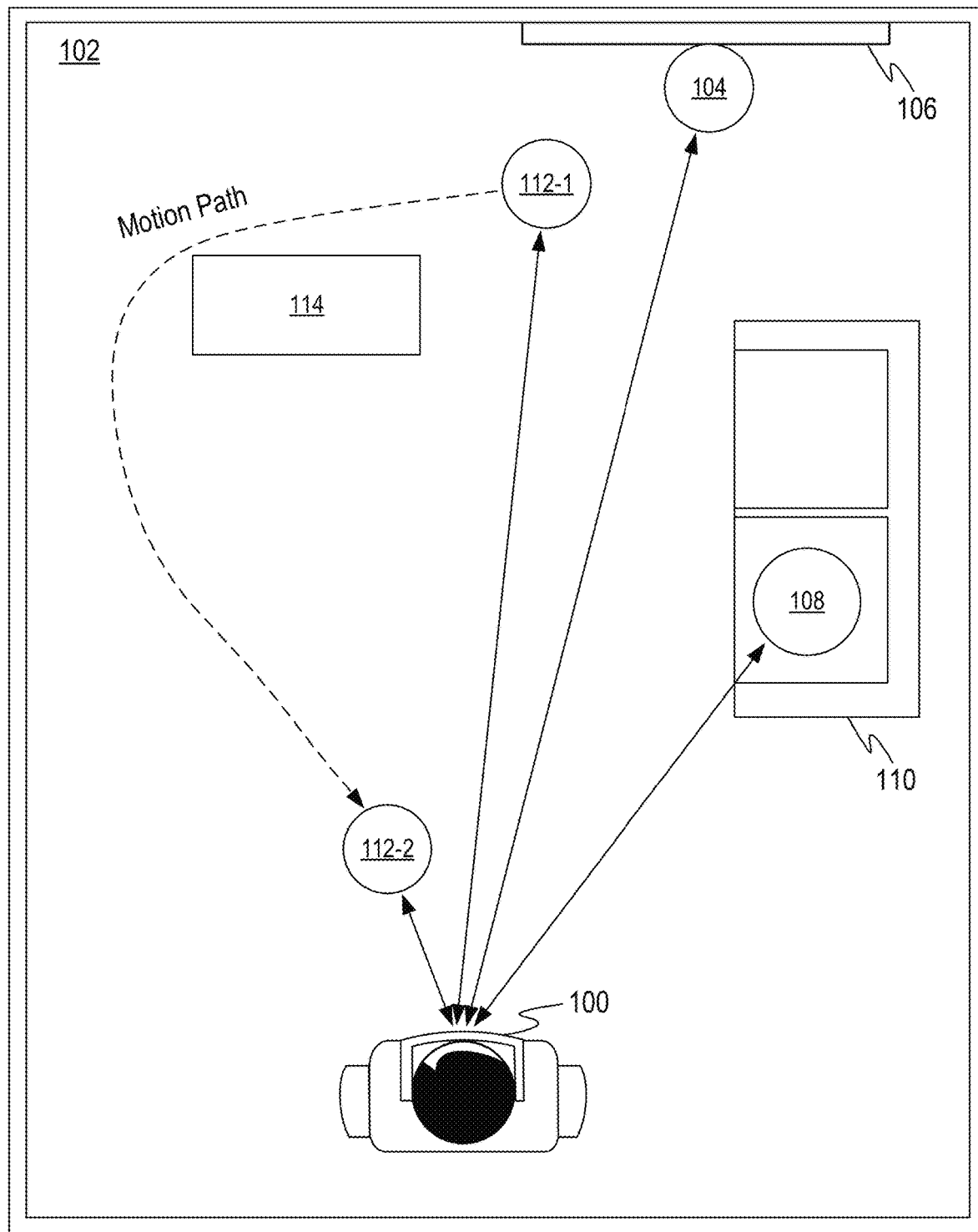
FIG. 1 shows an exemplary user wearing an augmented reality (AR) device.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

Augmented Reality (AR) devices are configured to overlay virtual content on the real world. The virtual content can include information related to nearby real-world objects or people. In some instances, the virtual content would apply only to a general area and might not need to be associated with any viewable real-world objects. However, in many cases it is desirable to incorporate virtual content with real-world objects. For example, virtual content can include characters that interact with the user and/or objects in the real world. In order to carry this incorporation of virtual content out in a more realistic manner, the virtual content can be displayed in a manner that makes it appear to be positioned at a distance away from a user that corresponds to the real-world object(s) that that virtual content is interacting with. This co-location of virtual and real-world content can be helpful in improving user immersion. Unfortunately, many AR devices are only configured to display content at a single fixed distance from a user, which can affect how realistically the virtual content is incorporated into the real-world environment. This limitation can be more noticeable when virtual content is traveling directly towards or away from a user as apparent changes in depth can be limited to an object appearing larger or smaller. The ability to accurately portray depth information can also be beneficial in the display of Virtual Reality (VR) environments, where virtual content hides a user's view of real world objects.

One solution to establishing virtual content at variable distances from a user of an AR device is to incorporate tunable lenses into a transparent display system of the AR device. The tunable lenses can be configured to cooperate to alter an apparent position of virtual content with respect to a user. The tunable lenses or varifocal elements can take many forms, including e.g., liquid crystal lenses, tunable diffractive lenses or deformable mirror lenses. In general, any lens that could be configured to change shape or configuration to adjust incoming light in a way that changes the apparent depth of virtual content of an AR device could be applied. The tunable nature of the lenses or varifocal elements beneficially allows virtual content to appear to be positioned at almost any distance from the user of the AR device.

The tunable lenses can be positioned on forward and rear-facing surfaces of a transparent or translucent display system. A first tunable lens on the rear-facing or user-facing side of the display can be configured to alter the incoming light generated by the AR device in order to cause the incoming light to display virtual content that appears to be a desired distance from the AR device. A second tunable lens on the forward-facing or world-facing side of the display can be configured to cooperate with the first tunable lens by assuming a complementary configuration that cancels out at least some of the adjustments made by the first tunable lens. In this way, light reflecting off real-world objects and passing through both the first and second tunable lenses before arriving at a user's eyes is not substantially distorted by the first tunable lens.

In some embodiments, the second tunable lens can allow some changes made by the first tunable lens to be applied to the light arriving from the real-world objects. For example, the tunable lenses can be configured to apply near-sighted, far-sighted and/or astigmatism corrections for users benefitting from vision correction. These type of corrections could be applied equally to light associated with both virtual content and real-world objects. The correction could take the form of an offset between the first and second tunable lenses. In such a configuration, the second tunable lens would not be completely complementary to the first tunable lens since some of the first tunable lens changes would also be applied to a view of the real-world objects.

In some embodiments, the second tunable lens can be periodically used to distort the real world view instead of just cancelling out effects created by adjustments made by the first tunable lens. In this way, the combination of tunable lenses can provide for augmented virtuality, mediated reality and other types of experiences that manipulate the real as well as virtual content.

In some types of display devices the index of refraction of certain optical components can limit the ability of the display device to generate a field of view large enough to provide a user with an immersive augmented reality experience. One solution to this problem is to equip the display device with a tunable lens. The tunable lens can be used as an optical steering device by shaping the lenses to shift light emitted along the periphery of the device towards the eyes of a user. In this way, the effective viewing angle can be substantially increased by the tunable lens. In some embodiments, a position at which light exits the display device can be sequentially shifted in a repeating scan pattern to produce a composite image. The optical steering device can be sequentially reshaped to optimize the optical steering device for each position in the scan pattern. For example, a first position in the scan pattern could be positioned on the far right side of the display device, while another position in the scan pattern could be near the bottom of the display device. By changing the optical steering device from shifting the light to the left in the first position to shifting the light upward in the second position the user can enjoy a wider field of view. By continuing to update the optical steering device in accordance with a current position of the scan pattern, portions of the light that would otherwise fall outside of a user's field of view become viewable.

These and other embodiments are discussed below with reference to FIGS. 1-12F; however, those skilled in the art will readily appreciate that the detailed description given herein with respect to these figures is for explanatory purposes only and should not be construed as limiting.

FIG. 1 shows an exemplary user wearing an augmented reality (AR) device 100. AR device 100 can be configured to display virtual content that appears to be located in various locations across a room 102. For example, virtual content 104 can be overlaid across a wall-mounted object 106. Wall mounted object 106 can take the form of a picture or television mounted to a wall of room 102. In this way, an appearance of wall-mounted object 106 can be altered by virtual content 104. Similarly, AR device 100 could be configured to project virtual content 108 on couch 110 in a way that creates the impression that an object or personage is resting on the couch. However, in order to realistically portray the virtual content in relation to other objects in room 102 it is also important to establish the virtual content at a comparable distance from the user. A depth detection sensor can be used to characterize the distance of various objects from the user. Information retrieved by the depth sensor can then be used to establish a distance for virtual content associated with objects adjacent to the virtual content. This becomes more complex when the virtual objects change distances from AR device 100. For example, virtual content 112 can take the form of a walking person taking a motion path that takes the person around table 114. Data retrieved by the depth sensor of AR device 100 can be used to define a motion path that avoids table 114 as virtual content 112 moves from position 112-1 to position 112-2. To accurately portray the position of virtual content 112 across its entire motion path, the perceived distance between AR device 100 and virtual content 112 should be constantly reduced.

Figure 2A:
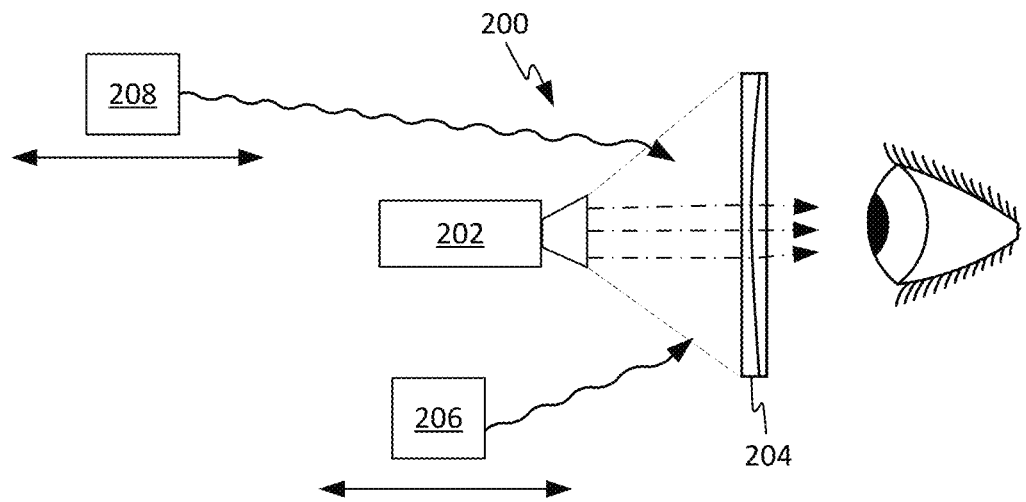
FIG. 2A shows a display system capable of displaying projected virtual content at any apparent distance relative a user of the display system.

FIG. 2A shows a display system 200 capable of displaying projected content at any distance. A projector 202 can display virtual content upon tunable lens 204. Tunable lens 204 can then change its optical configuration to adjust a depth at which the projected content is displayed. Tunable lens 204 could leverage any of a number of technologies, including e.g., a liquid crystal lens. When tunable lens 204 is a liquid crystal lens, the lens can be configured to change its phase profile in accordance with an amount of voltage applied to the liquid crystal lens. While this configuration works well to adjust the depth of the virtual content, light arriving from real-world objects 206 and 208 would be undesirably distorted. For example, an apparent position of real-world objects 206 and 208 could be shifted closer or farther from the user as indicated by the two-headed arrows. For this reason, use of display system 200 with an AR device could be problematic because of the undesired distortion of light from real-world objects since one object of augmented reality is for the user to be able to maintain sight of a majority of the real world.

Figure 2B:
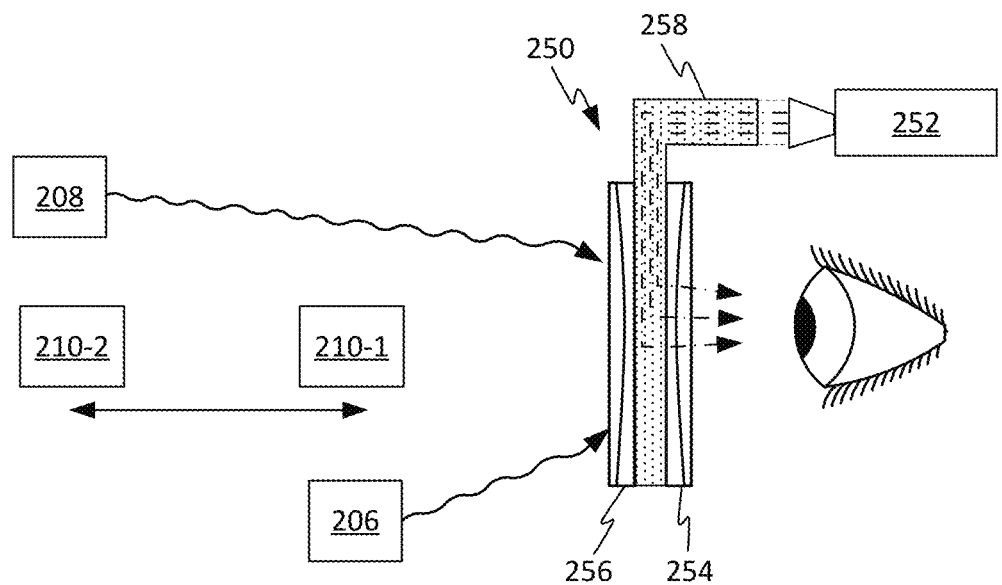
FIG. 2B shows a display system capable of adjusting the apparent distance to virtual content without affecting the appearance of real-world content in accordance with the described embodiments.

FIG. 2B shows a display system 250 capable of adjusting the apparent distance to virtual content without affecting the appearance of real-world content. This is accomplished by projecting virtual data between tunable lenses 254 and 256 with a waveguide 258 that redirects light from projector 252 between tunable lenses 254 and 256 and then through tunable lens 254 and towards the eye of a user. In this way, the light emitted by projector 252 can be adjusted by tunable lens 254. Tunable lens 256 can be configured to adjust in a manner opposite to tunable lens 254. The effect of this is that any light originating from real-world objects 206 or 208 can pass through depth display system 250 substantially unaffected. In this way, the virtual content from projector 252 can be the only content that undergoes a focus shift, resulting in a shift in apparent position limited to the virtual content emitted by the projector.

While tunable lens 256 can be configured to prevent any changes made by tunable lens 254 from being applied to the perception of real-world objects, in some embodiments, tunable lens 256 can be configured to cooperate with tunable lens 254 to, e.g., correct a user's vision. A vision correction could result in a multi-diopter change being applied by tunable lens 256 that could be equally applied to real-world objects 206 and 208 on account of tunable lens 256 not fully cancelling out the effects of tunable lens 254. For example, tunable lens 254 could be reconfigured to apply a +2 diopter adjustment. Tunable lens 256 could then apply no diopter adjustment at all so that both virtual content 210 and real-world objects undergo a +2 diopter change, thereby allowing a user normally in need of a +2 diopter vision correction to wear display system 250 without needing any additional vision correction. With such a vision correction scheme in place, movement of virtual content 210 could involve changing the diopter adjustment of tunable lens 254 to +3 and the diopter adjustment of tunable lens 256 to −1 in order to maintain a +2 diopter offset for vision correction. Similarly, tunable lens 254 could be configured to apply an astigmatism adjustment that is not canceled out by tunable lens 256.

The configuration shown in FIG. 2B can be operated in other ways that allow for the tunable lenses to apply different effects. In some embodiments, the tunable lenses can be configured to purposefully throw real-world objects out of focus to allow a user to focus on virtual content 210-1. For example, it could be desirable for a software developer to, in a controlled gaming or entertainment environment, focus the user's attention on a message or even to enter into a more immersive virtual environment. By throwing real-world objects out of focus, the system would allow the system to mask out any distracting real-world stimulus without having to generate light to block the field of view across the entire display. In this way, the tunable optics can be used to shape the augmented reality experience.

Figure 3:
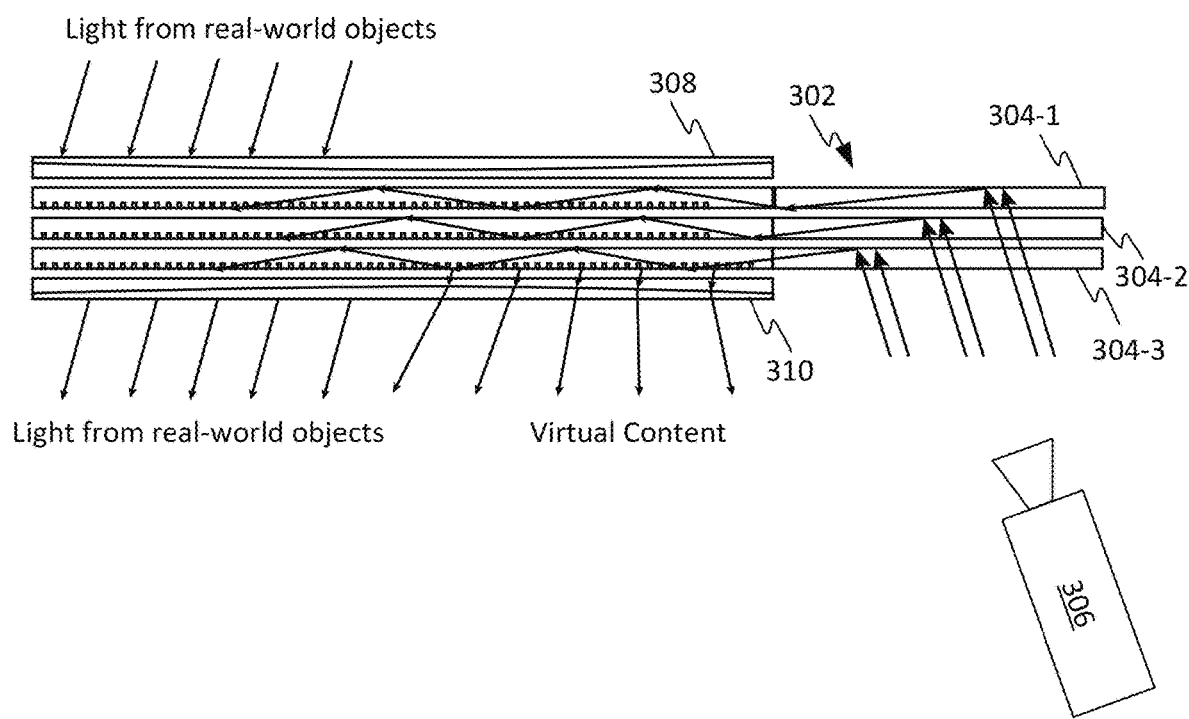
FIG. 3 shows a top view of one specific configuration in which diffractive optics of a waveguide are arranged to guide three different colors of light emitted by a projector between tunable lenses and then towards a user in accordance with the described embodiments.

FIG. 3 shows a top view of one specific configuration in which diffractive optics of a waveguide are arranged to guide three different colors of light emitted by a projector between tunable lenses and then towards a user. In some embodiments, waveguide 302 can include three discrete light paths 304-1, 304-2 and 304-3 for different colors of light such as, e.g., red green and blue. Each of light paths 304 can utilize diffractive optics to direct light from a projector 306 between tunable lenses 308 and 310 and then out through tunable lens 310 towards the eye of a user. Waveguide 302 can be arranged in a way that causes the resulting virtual content to appear to be positioned at infinity when tunable lens 310 is not applying any changes to the light coming from waveguide 302. In such a configuration, tunable lens 310 could be configured to decrease the apparent distance between the user and the virtual content being projected through the diffractive optics by varying amounts based on a desired position of the virtual content with respect to the user and other real-world objects. As depicted, the light from real-world objects remains substantially unaffected by tunable lenses 308 and 310 while the light passing through waveguide 302 is affected by tunable lens 310.

Figure 4A:
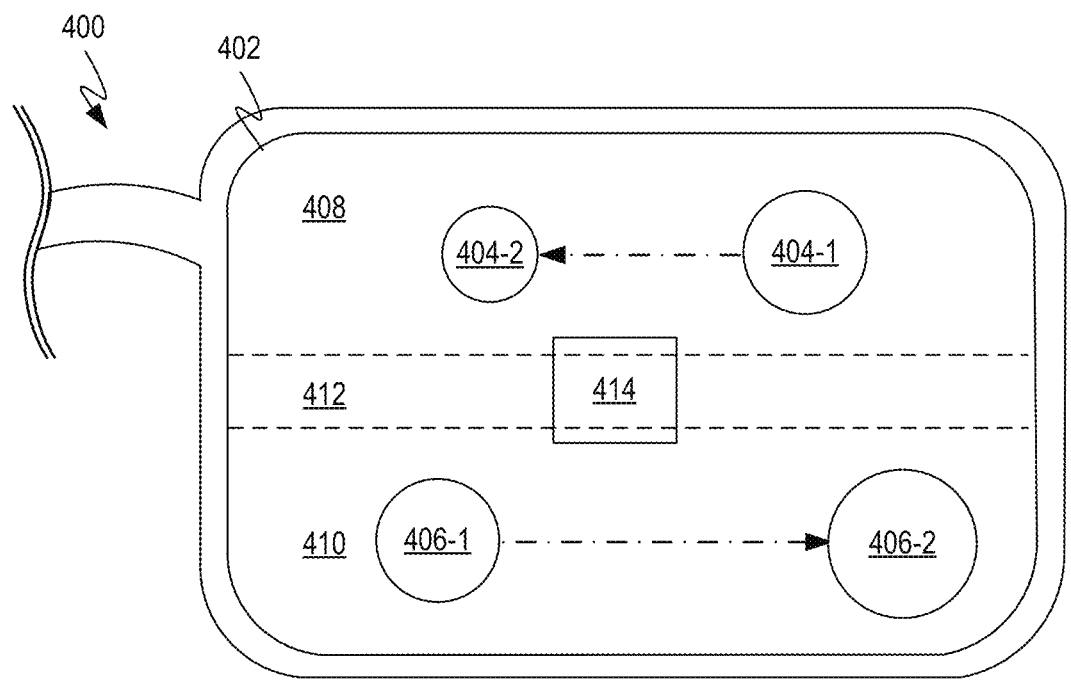
FIGS. 4A-4B show a transparent display of an AR device displaying first virtual content and second virtual content in accordance with the described embodiments.
Figure 4B:
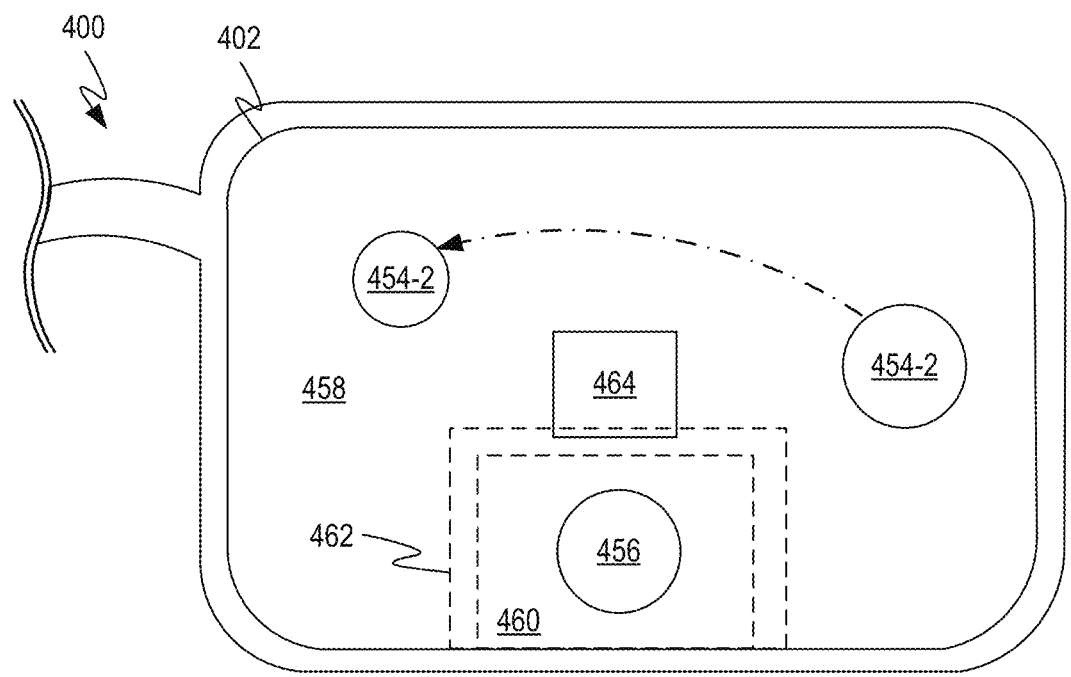

FIGS. 4A-4B show a transparent display 402 of an AR device 400 displaying first virtual content 404 and second virtual content 406. FIG. 4A depicts arrows that show how virtual content 404 and 406 move across transparent display 402 over a particular period of time. During this movement, virtual content 404 travels farther away from AR device 400 and virtual content 406 travels closer to AR device 400. Because transparent display 402 includes tunable lenses for adjusting the apparent depth of the virtual content, an upper region 408 of transparent display 402 can be optically configured to display virtual content 404 moving farther away from AR device 400 and lower region 410 can be configured to display virtual content 406 moving closer to AR device 400. Transition region 412 can take the form of a region where the shape of the tunable lenses is gradually adjusted to accommodate the different optical configurations and prevent the appearance of a visual seam between upper and lower regions 408 and 410. Transition region 412 can be larger or smaller depending on the amount of difference between regions 408 and 410. While real-world object 414 is positioned within transition region 412, it should be appreciated that when transparent display 402 includes two tunable lenses that cooperate to prevent distortion of real-world objects that even transition region 412 would have little to no effect on the appearance of real-world object 414. For this reason, a processor of AR device 400 attempting to determine suitable areas of display 402 for upper region 408 and lower region 410 would only need to consider the path of motion for the virtual content when determining how to vary the optical configuration for independently moving virtual content.

FIG. 4B shows an exemplary embodiment where virtual content 454 is in motion and virtual content 456 remains stationary. In such a configuration motion region 458 can take up most of the viewable area of transparent display 402, while stationary region 460 can take up a much smaller area that limited primarily to virtual content 456. Furthermore, motion region 458 can alter an apparent distance between AR device 400 and virtual content 454, while stationary region 460 can maintain the apparent distance to virtual content 456. This narrow stationary region 460 can be even more convenient where head movement of the user is deemed unlikely or where the location of the virtual content within transparent display 402 is not governed by head movement of the user. For example, virtual content 456 could take the form of status information such as time of day, battery charge or navigation information. This type of information could be distracting if it were also to move with whatever other virtual content the user was interacting with. It should also be noted that again real-world content 464 remains unaffected by apparent depth changes affected by the tunable lenses of transparent display 402.

Figure 5A:
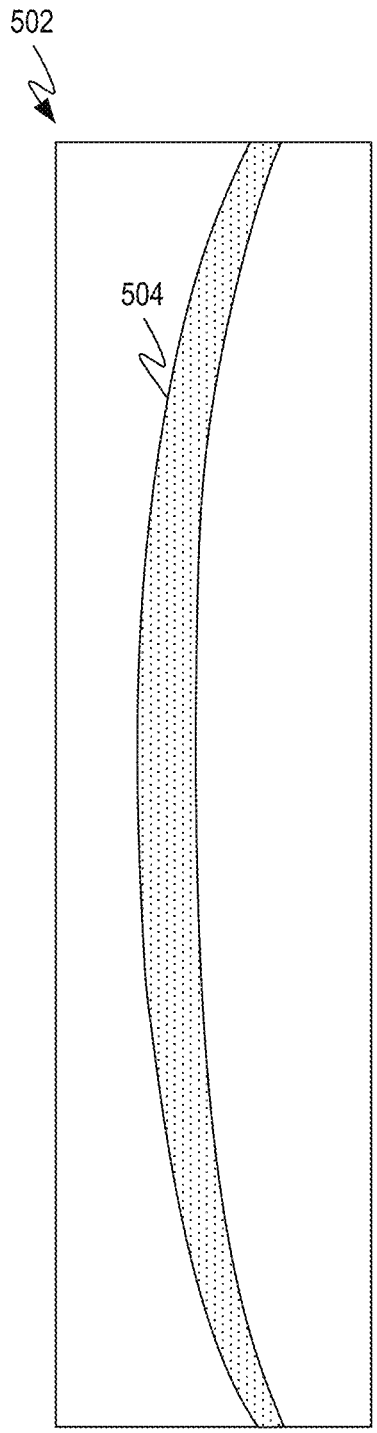
FIGS. 5A-5B show side views of a tunable lens and how the tunable lens can be adjusted to accommodate different virtual content positions in accordance with the described embodiments.
Figure 5B:
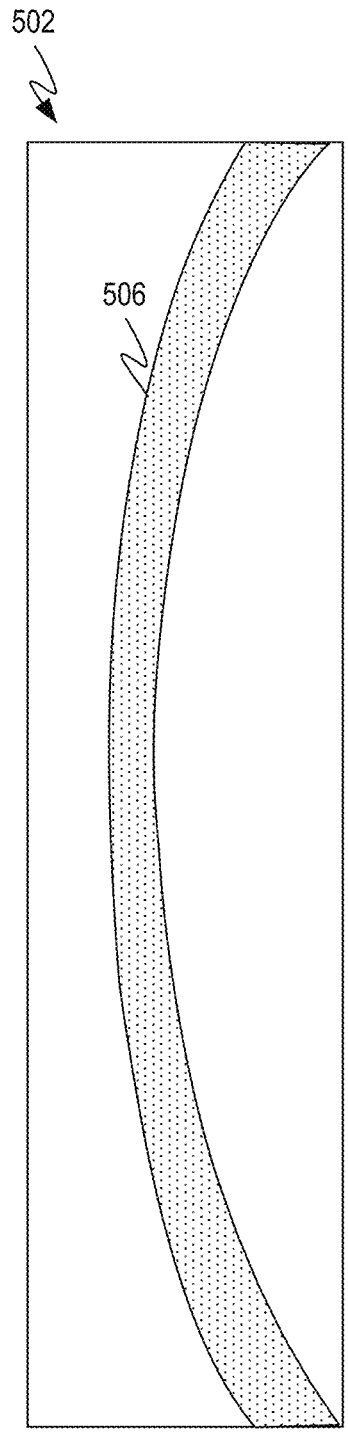

FIGS. 5A-5B show side views of tunable lens 502 and how tunable lens 502 can be adjusted to accommodate different virtual content positions. FIG. 5A shows how tunable lens 502 can be substantially rectangular in shape and form a lens element 504 within the rectangular volume. Lens element 504 can be configured to reshape light emitted from a waveguide in order to establish virtual content at a desired distance from a user of an AR device. When tunable lens 502 takes the form of a liquid crystal lens, lens element 504 can change shape into lens element 506 in response to a voltage being applied to tunable lens 502. The increased depth and curvature of lens element 506 can cause virtual content to appear closer the AR device than lens element 504. In this way, tunable lens can be configured to change the apparent distance to virtual content viewed from an AR device.

Figure 5C:
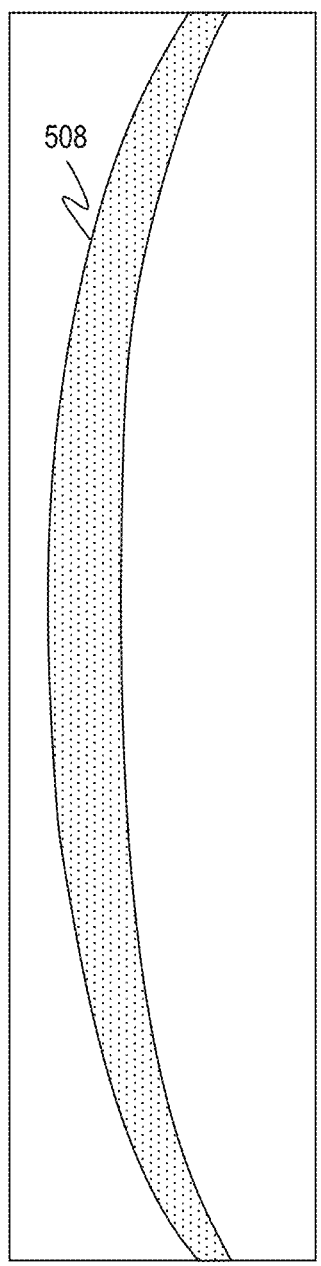
FIGS. 5C-5D show how a tunable lens can be adjusted to accommodate motion of multiple independently moving virtual objects in accordance with the described embodiments.
Figure 5D:
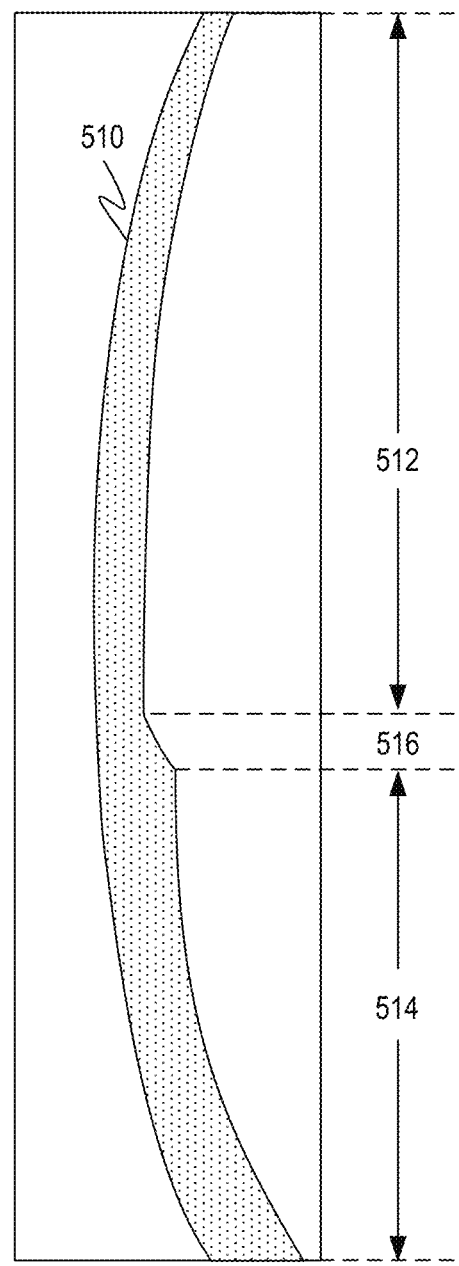

FIGS. 5C-5D show how tunable lens 502 can be adjusted to accommodate motion of multiple independently moving objects represented by virtual content. In particular, FIGS. 5C and 5D can show how tunable lens 502 would have to move to accommodate the virtual content motion depicted in FIGS. 4A-4B. FIG. 5C could correspond to the situation where virtual content 404 and 406 begin at the same distance from an AR device. FIG. 5D shows how tunable lens 502 transitions from forming lens element 508 to lens element 510. The portion of lens element 510 corresponding to upper region 512 can have a thinner effective shape and smaller effective curvature to give the appearance of virtual content 404 moving farther away from the AR device while the portion of lens element 510 corresponding to lower region 514 can have a thicker effective shape and larger effective curvature to give the appearance of virtual content 406 moving closer to the AR device. Transition region 516 includes a gradient that smoothly changes the effective thickness of lens element 510 without creating a visible line affecting the real-world view through tunable lens 502.

Figure 6:
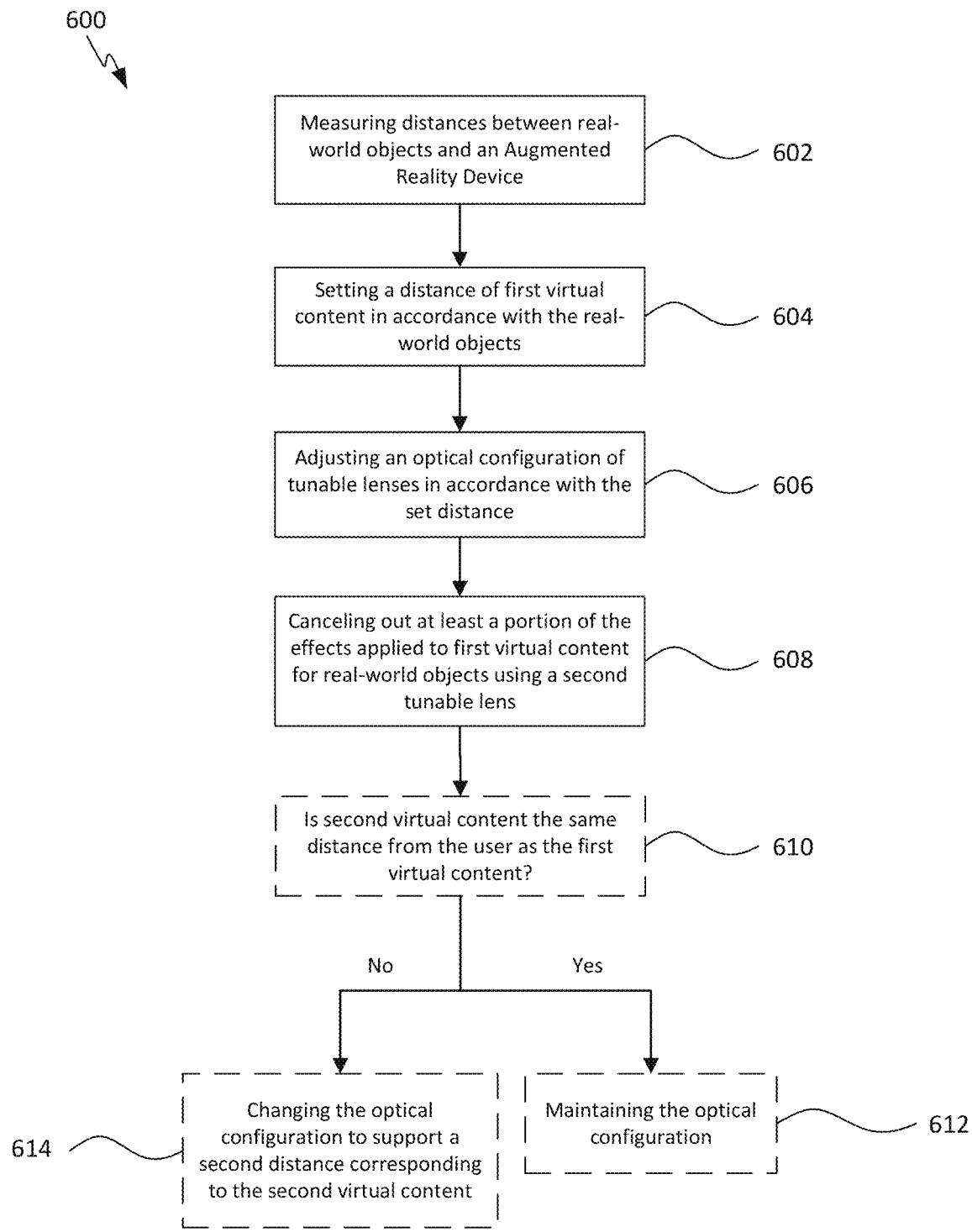
FIG. 6 shows a flow chart depicting a method for displaying virtual content at multiple depths using a small form factor AR device.

FIG. 6 shows a flow chart depicting a method for displaying virtual content at multiple depths using a small form factor AR device. At 602, a depth sensor of an AR device characterizes real-world objects within a field of view of a user of the AR device by determining a distance between the user and the real-world objects. At 604, a processor of the AR device is configured to determine a location or motion path for first virtual content relative to the characterized real-world objects. At 606, an optical configuration of a first tunable lens of the AR device is configured for initial display of the first virtual content. At 608, an optical configuration of a second tunable lens of the AR device is configured to prevent the first tunable lens from adversely affecting the view of real-world objects. This is accomplished by an optical configuration of the second tunable lens that cancels out at least a portion of the optical effects applied by the first tunable lens for the real-world objects. It should be noted that in some cases the second tunable lens can be complementary to the first tunable lens to cancel effects of the first tunable lens on the appearance of real-world objects. In some embodiments, certain vision enhancements can be applied by leaving some of the adjustments made by the first tunable lens unchanged. In some embodiments, where display of second virtual content is desired, the AR device can be configured to check to see whether the first and second virtual content should be the same distance from the user. At 612, AR device can maintain the optical configuration by continuing to adjust the tunable lenses to track the position of the first and second virtual content.

At 614, when first and second virtual content are at different distances from the user, the processor can be configured to apply different optical configurations to different regions of the AR device display using the tunable lenses. In this way, a user can be presented with virtual content at different distances from the user. In some embodiments, the second virtual content can be purposefully left out of focus when the user's attention is meant to be focused on the first virtual content. For example, focus can be transitioned to the second virtual content once interaction with the second virtual content is desired by the user or queued by a piece of software being executed by the AR device. In some embodiments, focus transitions between virtual content at different distance from the user can be queued by eye tracking sensors configured to determine whether the user is focusing on a particular virtual object. In other embodiments, a user can manually select virtual content for interaction at which point focus could be adjusted to properly depict the distance between the selected virtual object and the user. Imaging software can be used to apply a blurring effect to any virtual content projected by the AR device that is outside of the current depth plane to avoid any impression that all virtual content is the same distance from the user.

Figure 7A:
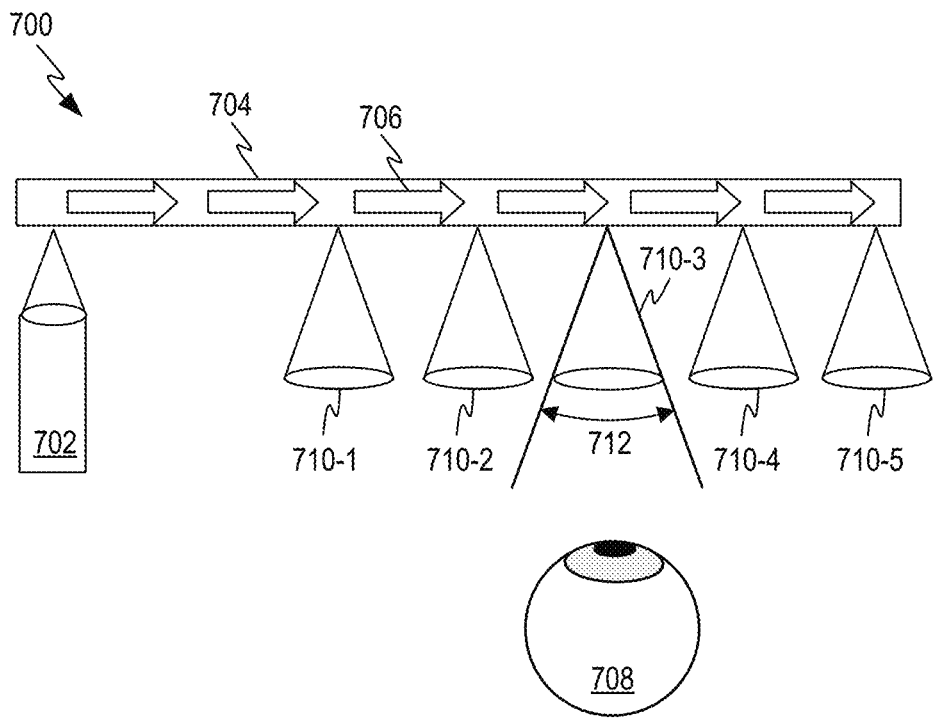
FIGS. 7A-7B show various embodiments configured to direct light from a display device into an eye of a user.
Figure 7B:
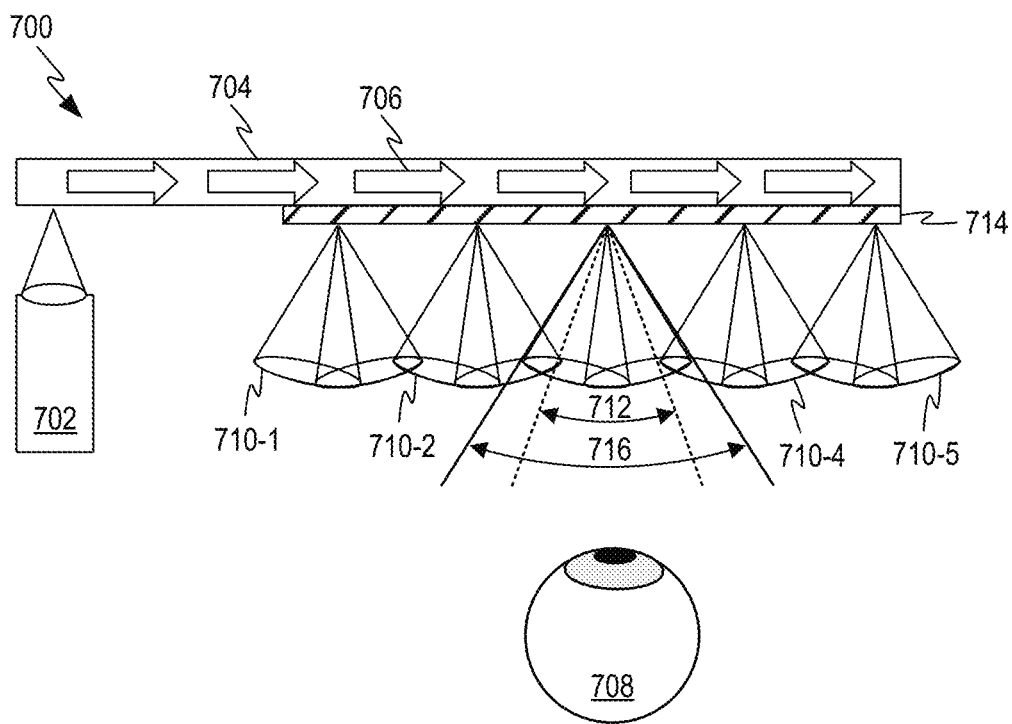

FIGS. 7A-7B show various embodiments configured to direct light from a display device into an eye of a user. FIG. 7A shows a top view of display device 700, which includes a light projector 702 and a waveguide 704 configured to redirect light 706 emitted by projector 702 towards an eye 708 of a user. While waveguide 706 can be configured to emit imagery from thousands or even millions of locations, FIG. 7A shows light being emitted from five exemplary locations from which five output cones 710-1 through 710-5 are depicted. Each of output cones 710 represent light emitted from each location being spread across an angle 712, which can be referred to as a service angle. As depicted, the limited size of each output cone prevents the light exiting waveguide 704 along output cones 710-1 and 710-5 from arriving at eye 708 of the user. In some embodiments, angle 712 is limited below a desired threshold by certain characteristics of the display technology such as for example the material refractive index of waveguide 706. Additional details regarding light fields and waveguide-based display devices are provided in U.S. Provisional Patent Application No. 62/539,934, entitled "HIGH RESOLUTION HIGH FIELD OF VIEW DISPLAY," which is incorporated by reference herein in its entirety.

FIG. 7B shows how display device 700 can incorporate one or more optical steering components, such as an optical steering device 714 configured to sequentially shift light 706 exiting waveguide 704 in different directions to expand the effective viewing angle 712 to angle 716, as depicted. In this way, the user's eye 708 is able to view a wider field of view due to the larger effective angle 716 created by shifting output cones 710-1-710-5 in different directions. As depicted, the expanded effective angle 716 allows at least some of the light from output cones 710-1 and 710-5 to arrive at the user's eye 708. In some embodiments, optical steering component 714 can take the form of one or more tunable prisms capable of assuming multiple different optical configurations (e.g. a liquid crystal lens having a reconfigurable phase profile). Each optical configuration can be configured to shift the direction of output cones 710 in a different direction. While FIG. 7B only shows light 706 being steered in two different directions, it should be appreciated that light 706 can be steered in many other different directions. Furthermore, it should be appreciated that in addition to a tunable prism other optical elements could be configured to redirect light towards the eyes of a user and that the exemplary prism embodiment should not be construed as limiting the scope of the disclosure.

Examples of other such optical elements (e.g., time-varying gratings) are described in further detail in U.S. patent application Ser. No. 14/555,585, which is incorporated by reference herein in its entirety. In some examples, a polymer dispersed liquid crystal grating or other tunable grating may be implemented as optical steering components and used to steer output cones 710-1-710-5 by modifying an angle of TIR waveguided light, an angle at which light is outcoupled by an outcoupling optical element of the waveguide 704, or a combination thereof. In some embodiments, one or more metasurfaces (e.g., made from metamaterials) may be implemented as optical steering components. Further information on metasurfaces and metamaterials that may be used as optical steering components in various embodiments of this disclosure can be found in U.S. Patent Publication No. 15/588,350, U.S. Patent Publication No. 15/182,528, and U.S. Patent Publication No. 15/182,511, all of which are hereby incorporated by reference herein in their entireties. As such, it should be appreciated that optical steering components may be switchable or otherwise controllable to operate in a discrete number of different steering states, and that exemplary tunable optical steering devices should not be construed as limiting the scope of the disclosure.

Figure 8A:
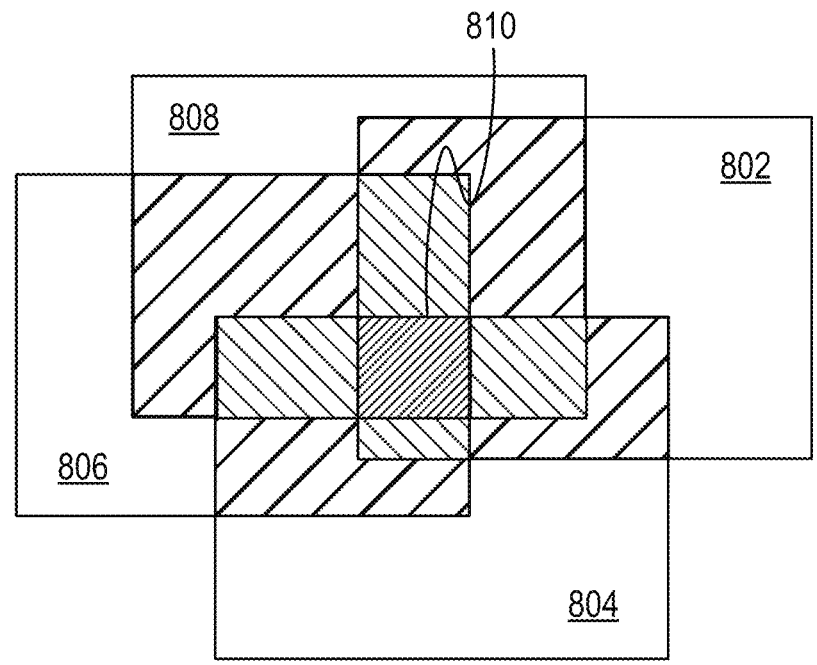
FIGS. 8A-8C show exemplary scan patterns that can be emitted by a display device for expanding the field of view of the display device.
Figure 8B:
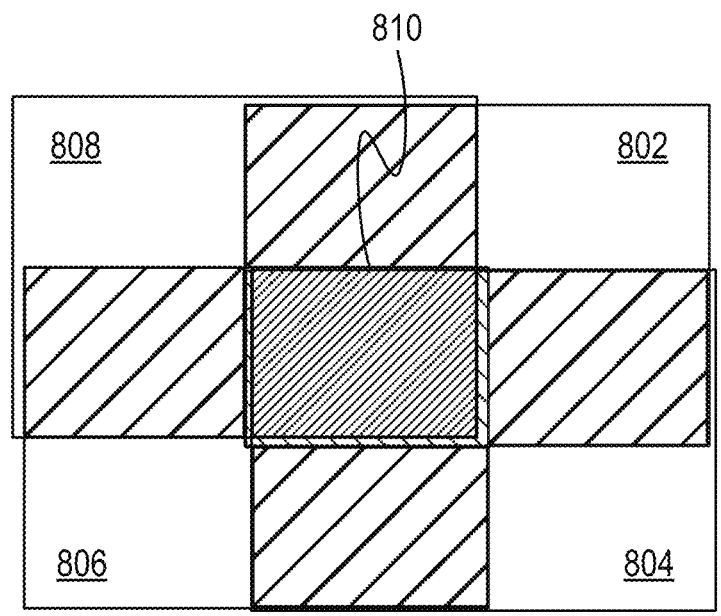
Figure 8C:
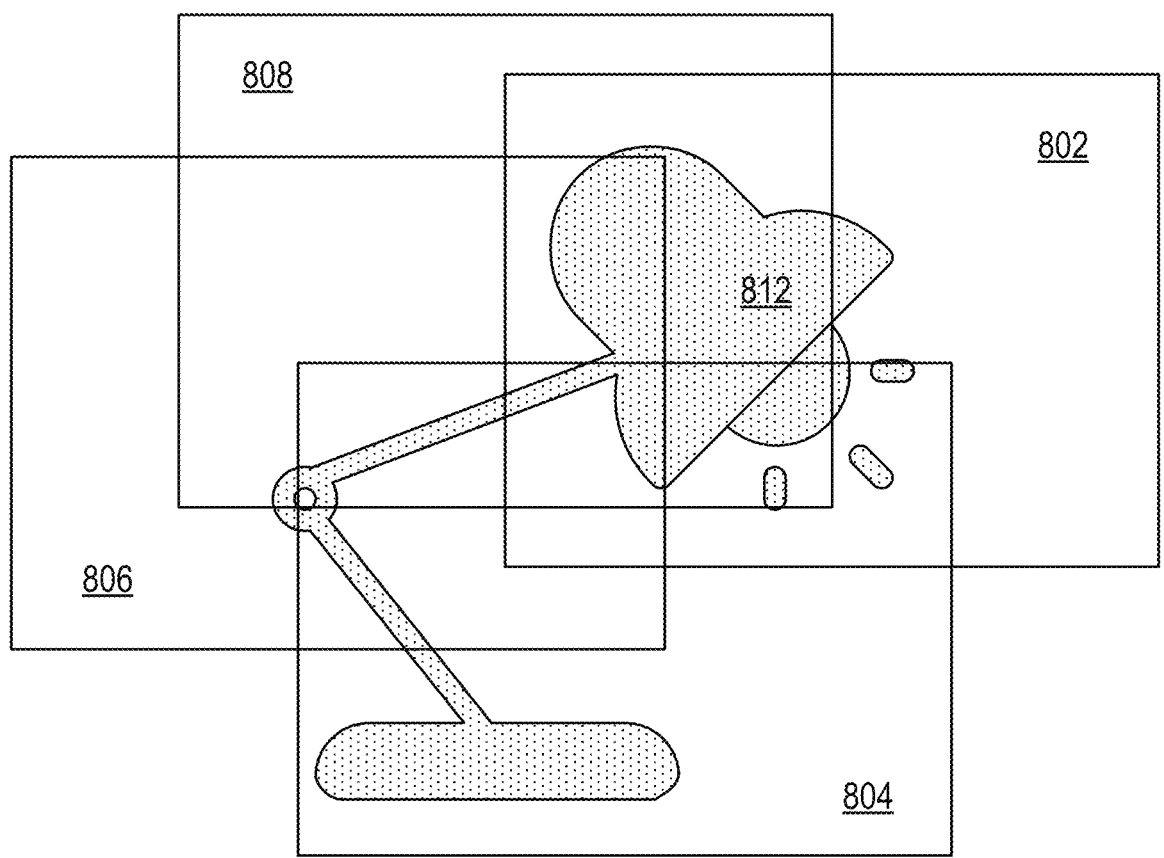

FIGS. 8A-8C show exemplary scan patterns that can be generated by a suitable display device and help to expand the field of view of the display device. FIG. 8A shows a first scan pattern that includes four different image locations 802, 804, 806 and 808. Each of the depicted image locations can represent an aggregate of the light emitted from the display device at a particular point in time. In some embodiments, light can be delivered to locations 802-808 in numerical order. An optical steering device can then be used to shift the light back towards the eye of a user in accordance with the active image location. For example, when image location 808 is active the optical steering device can be configured to shift light downwards towards an eye of a user. When a video source is being presented by the display device, portions of a video frame corresponding to each image location can be sequentially displayed at each of the four location for each frame of the video. For example, when the video source has a frame rate of $\frac{1}{30}$ of a second, the corresponding portion of the video frame can be displayed at each location for $\frac{1}{120}$ of a second. In this way, an expanded field of view can be achieved without a frame rate reduction. In this way, the resulting image created by the scan pattern maintains a fluid frame rate and also generates a composite image with a substantially higher spatial resolution than would be possible using a single stationary image location. For example, an image projector only capable of displaying 480 lines of vertical resolution could reproduce an image or video source with more than 480 lines of resolution using the aforementioned scan techniques. Additional details regarding scan patterns, tiling functionality, and tiled display configurations are provided in U.S. patent application Ser. No. 14/555,585, which is incorporated by reference herein in its entirety.

FIG. 8A also shows how in some embodiments, portions of adjacent image location can overlap, as indicated by the hashed regions shown in FIG. 8A. This results in content within the image locations overlapping. The overlap can be used to further improve certain aspects of a composite image generated by the display device. For example, an increase in resolution within a central region 810 can be achieved by applying one or more super-resolution techniques. In particular, the portions of each image frame that overlap can be sub-sampled and slightly offset allowing an increase in pixel density in lieu of having pixels stacked atop one another. This produces a super-resolution effect in portions of the display with overlapping regions. For example, in embodiments where a display processor is capable of generating 4K resolution imagery (i.e. 2160 lines of vertical resolution), the 4K resolution imagery could be used to achieve the super-resolution effect using an image source normally only capable of generating substantially lower resolutions by distributing the pixels within overlapped regions of the scan pattern. Furthermore, when a high frame rate video file is being displayed, each sequentially displayed frame can be associated with a different frame of the video. For example, when playing back a 120 frames per second video source, portions of the display within central region 810 could enjoy the full 120 frames per second frame rate, while non-overlapped regions would only be updated at a rate of 30 frames per second. Overlapped regions near central region 810 could be refreshed at a rate of 60 or 90 frames per second depending on the number of overlapped locations in a particular region.

FIG. 8B shows a second scan pattern with a large central region 810. This second scan pattern results in a ninth of the total image being overlapped by each of image locations 802-808. In this way, a resolution or frame rate within central region 810 can be substantially greater than in the non-overlapped regions. The depicted scan pattern can achieve a resolution or frame rate increase of up to four times, which corresponds generally to the number of overlapping frames. This type of scan pattern can be particularly beneficial when content of interest is located in the central region of the display. In some embodiments, the scan pattern can be changed to create increasing amounts of overlap in situations where less virtual content is being presented in peripheral regions of the display.

FIG. 8C shows how imagery positioned in each of image locations 802-808 cooperatively generates a composite image 812 that as depicted takes the form of a desk lamp. In addition to creating a composite image 812 that is larger than any single one of image locations 802-808, the sequential display of imagery at each of image locations 802-808 allows optical properties of the display to be changed in accordance with which of image locations 802-808 is currently active during a given scan. For example, when imagery is being displayed at image location 804, the optical properties could be adjusted to shift light representing the base of lamp 812 up towards the user's eye. In some embodiments, the location of the scan pattern can be positioned in a location of the display that places a virtual image such as lamp 812 within a central region of the scan pattern. This allows central and/or important features of the image to be displayed in a larger number of the image locations.

Figure 9A:
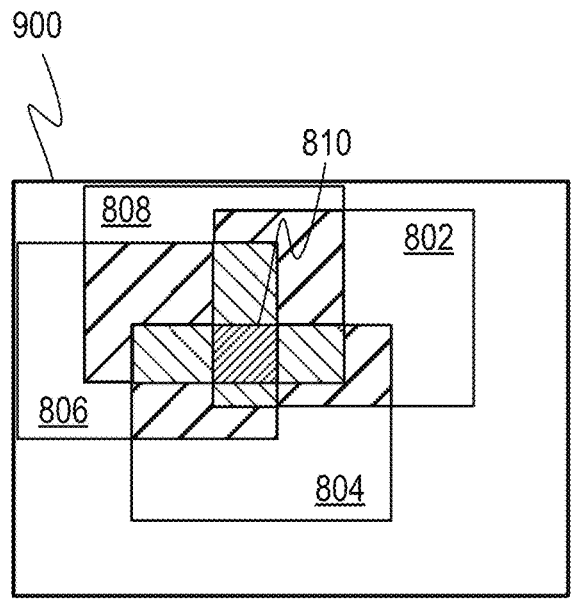
FIGS. 9A-9C show how the first scan pattern depicted in FIG. 8A can be shifted around a display region.
Figure 9B:
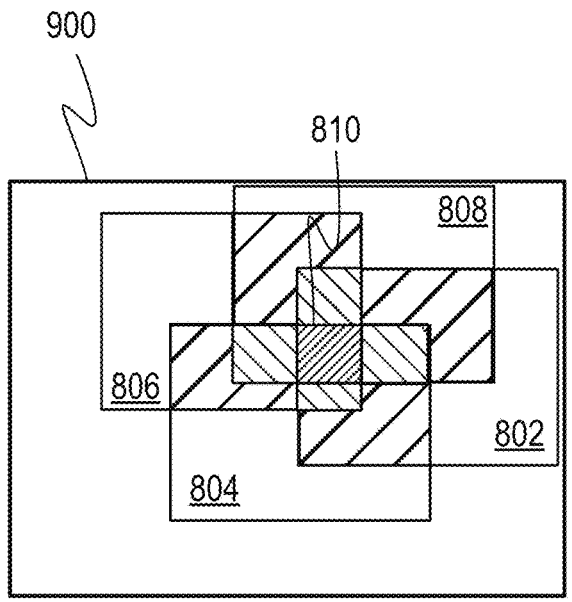
Figure 9C:
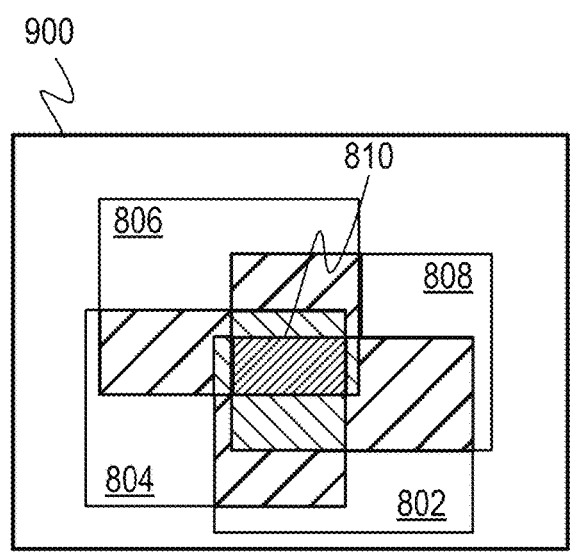

FIGS. 9A-9C show how the first scan pattern depicted in FIG. 8A can be shifted around within display region 900.

FIG. 9A shows the first scan pattern in the upper left corner of display region 900 at a time $t_0$. FIG. 9B shows the first scan pattern shifted towards the upper right corner of display region 900 at a time $t_1$. In some embodiments, the display device can include an eye gaze tracker. Sensor data provided by the eye gaze tracker can be utilized to shift the scan pattern to a location within display region 900 corresponding to a user's current focus point. In some embodiments, this sensor data can help keep central region 810 in a location that covers a user's foveal vision (i.e. that portion of a user's vision with the highest acuity). By continually adjusting the scan pattern in this manner a user's impression of immersion can be improved. This method can be particularly effective when prominent content frequently shifts away from a central portion of display region 900. Exemplary systems and techniques for performing foveal tracking, rendering foveated virtual content, and displaying foveated virtual content to a user are described in further detail in U.S. Provisional Patent Application No. 62/539,934, entitled "HIGH RESOLUTION HIGH FIELD OF VIEW DISPLAY," which is incorporated by reference herein in its entirety.

FIG. 9C shows the first scan pattern shifted again towards a lower portion of display region 900. FIGS. 9A-9C also shows how image locations 802-808 can change in accordance with the position of the first scan pattern and/or to better represent content being provided to a user. For example, an area across which the first scan pattern extends could be reduced in order to better represent a virtual image that is much smaller than the standard scan pattern size. In some embodiments, changing the scan pattern can help to optimize overlapping regions of the scan pattern for a particular representation of virtual content.

Figure 10A:
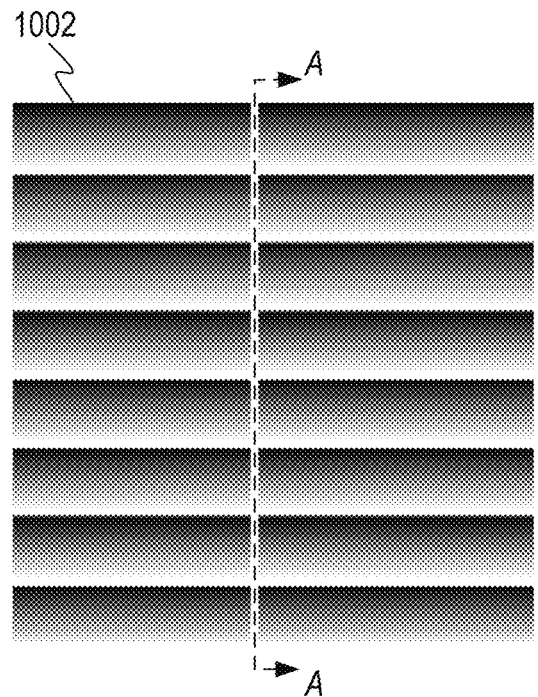
FIGS. 10A-10E show various configurations for an optical steering device.
Figure 10B:
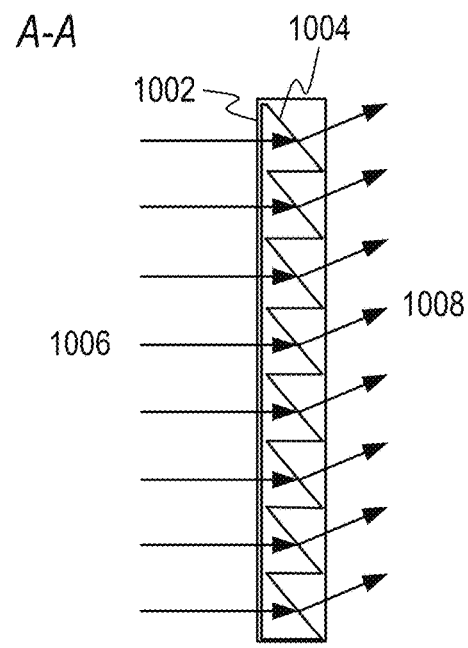

FIGS. 10A-10E show various phase profiles for an optical steering device similar to optical steering device 714. In particular, FIG. 10A shows a front view of an exemplary optical steering device 1002 in a first optical configuration 1004 for shifting light vertically. FIG. 10B shows a cross-sectional side view of optical steering device 1002 in accordance with section line A-A. Optical steering device 1002 can take the form of a liquid crystal lens capable of changing its phase profile in accordance with an amount of voltage applied to the liquid crystal lens. More specifically, optical steering device 1002 may include two conducting layers with structures capable of producing an electric field responsive to application of voltage thereto. In this way, optical steering device 1002 can shift between multiple different optical configurations. The first optical configuration 1004 can have a phase profile with multiple refractive indexes within optical steering device 1002. In some examples, the local refractive index of the optical steering device 1002 may be tailored to meet a prism function or another desired optical function. In at least some of these examples, the optical steering device 1002 may exhibit a relatively large phase gradient (e.g., $\sim\pi$ rad/μm). In particular, the refractive index can vary in accordance with a saw-tooth profile, as depicted, each of the teeth can be configured to receive a portion of light 1006 and emit light 1008 in a different direction. The size and/or spacing of the teeth can be adjusted to reduce or increase the change in the angle of light passing through optical steering device 1002. For example, the angle of each wedge could be gradually reduced as the pattern of wedges approaches a central region of the display. This first optical configuration 1004 could be used to shift frames of a scan pattern located in a lower central region of the display.

Figure 10C:
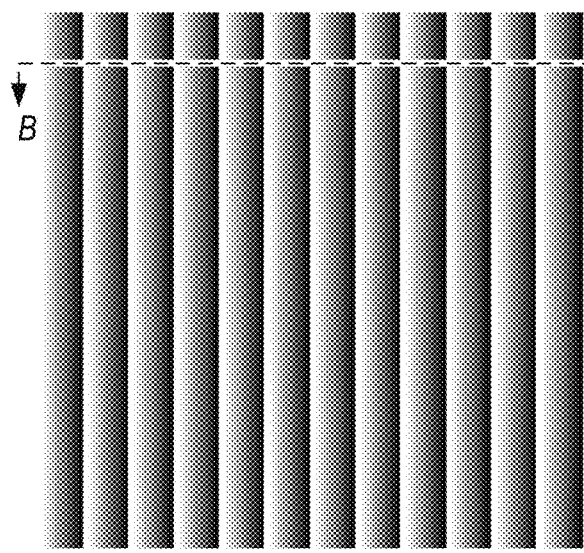
Figure 10D:
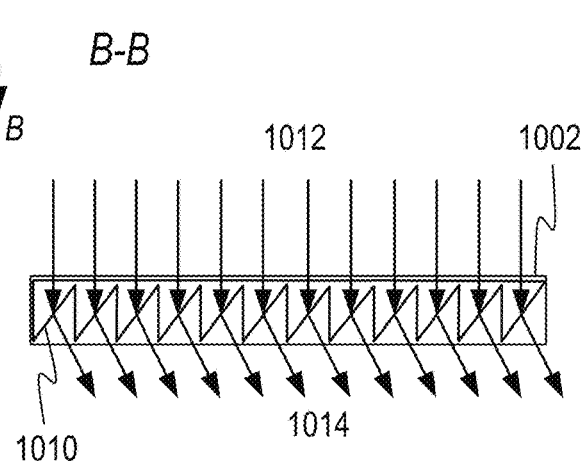

FIG. 10C shows a front view of optical steering device 1002 in a second optical configuration 1010. FIG. 10D shows a cross-sectional top view of optical steering device 1002 in the second optical configuration in accordance with section line B-B. In the second optical configuration, optical steering device 1002 is configured to shift light 1012 laterally. As depicted, optical steering device 1002 receives light 1012 and outputs laterally shifted light 1014. While both the first and second depicted optical configurations shift the direction of the light they do so only vertically or horizontally. It should be appreciated that in some embodiments, two optical steering devices can be layered atop one another to shift the received light both vertically and horizontally.

Figure 10E:
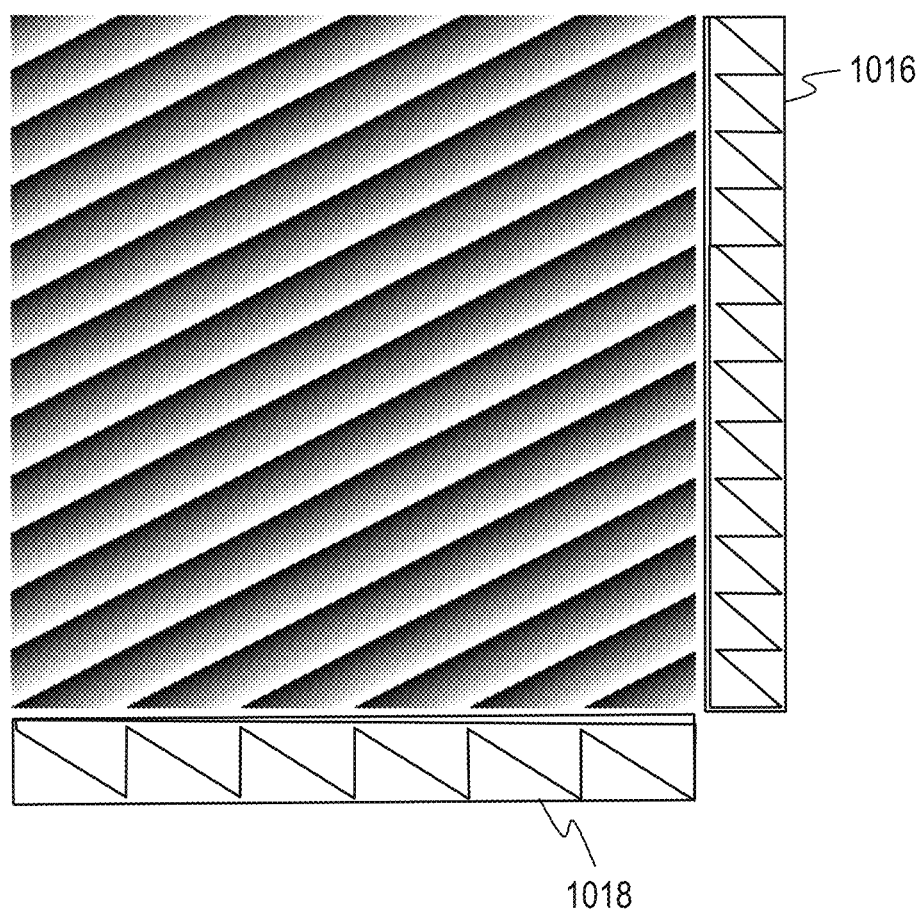

FIG. 10E shows how by orienting a series of tooth-shaped ridges diagonally across optical steering device 1002, light can be shifted both vertically and horizontally by a single optical steering device 1002. FIG. 10E also shows how the depicted diagonal configuration can accomplish the shift in light that would otherwise utilize one-dimensional optical steering devices 1016 and 1018. The depicted configuration could be assumed by optical steering device 1002 during frames of a scan pattern in which light exits the waveguide through a lower right region of a display region. It should be noted that while multiple optical configurations have been depicted, optical steering device 1002 can be rearranged in many other configurations that have not been depicted.

Figure 11A:
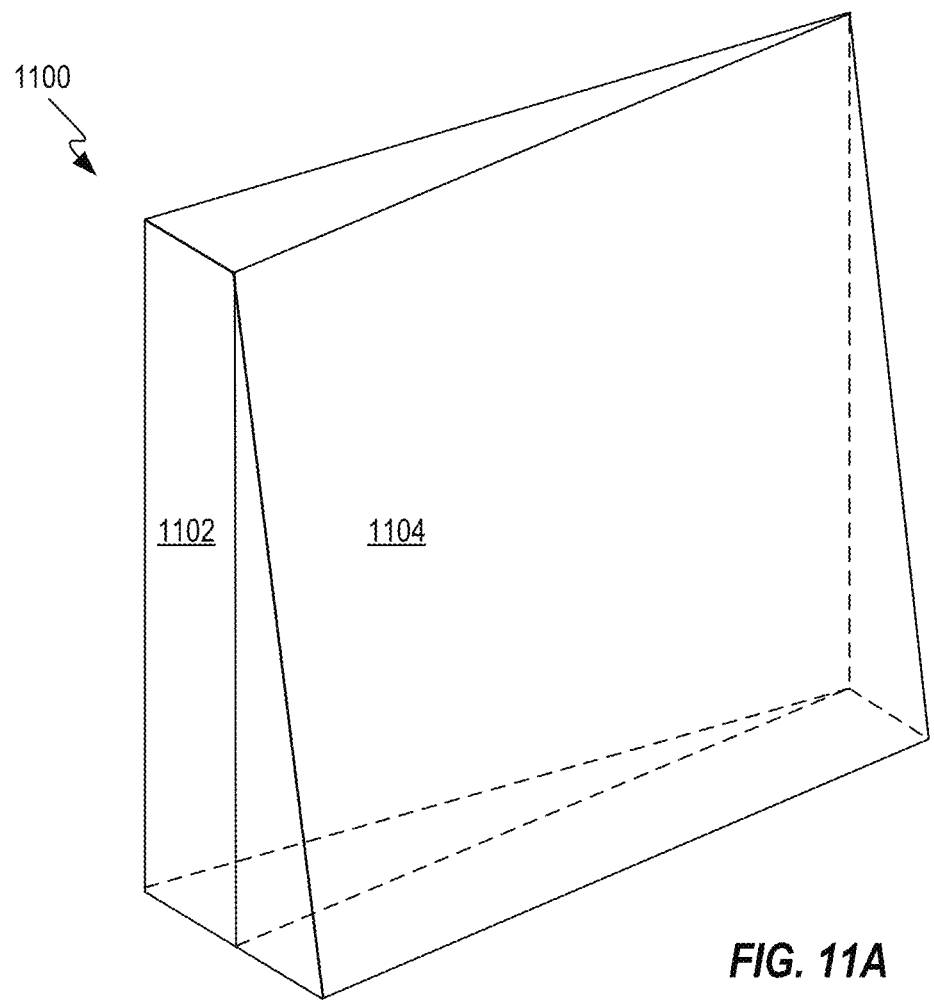
FIGS. 11A-11B show an optical steering device can include lenses stacked atop one another to shift incoming light both vertically and horizontally.
Figure 11B:
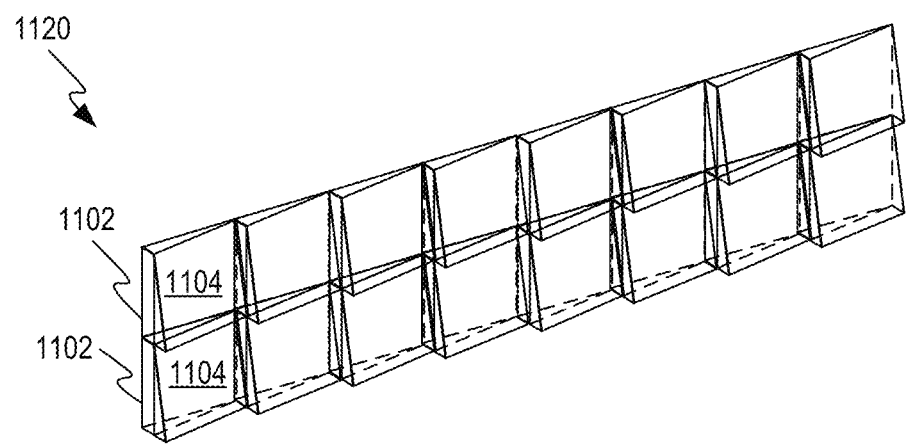

FIGS. 11A-11B show how an optical steering device can include lenses stacked atop one another to shift incoming light both vertically and horizontally. FIG. 11A shows a perspective view of the phase shift of optical steering device 1100, which includes horizontal shift lens 1102 and vertical shift lens 1104. The two lenses can be stacked atop one another in order to redirect light incident to the lenses. This optical configuration allows incoming light to be shifted both vertically and horizontally. FIG. 11B shows an optical steering device 1120 having a reduced thickness achieved by using an array of multiple lenses. In some embodiments, a liquid crystal lens can be used to form an optical configuration equivalent to multiple horizontal shift lenses 1102 and vertical shift lenses 1104, as depicted in FIG. 11B.

Figure 11C:
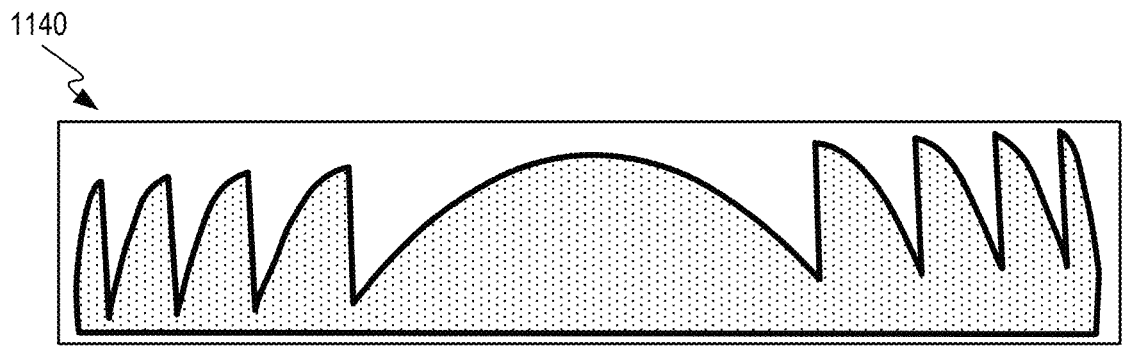
FIGS. 11C-11D show a cross-sectional side view and top view respectively of a liquid crystal lens 1140 having a Fresnel lens configuration.
Figure 11D:
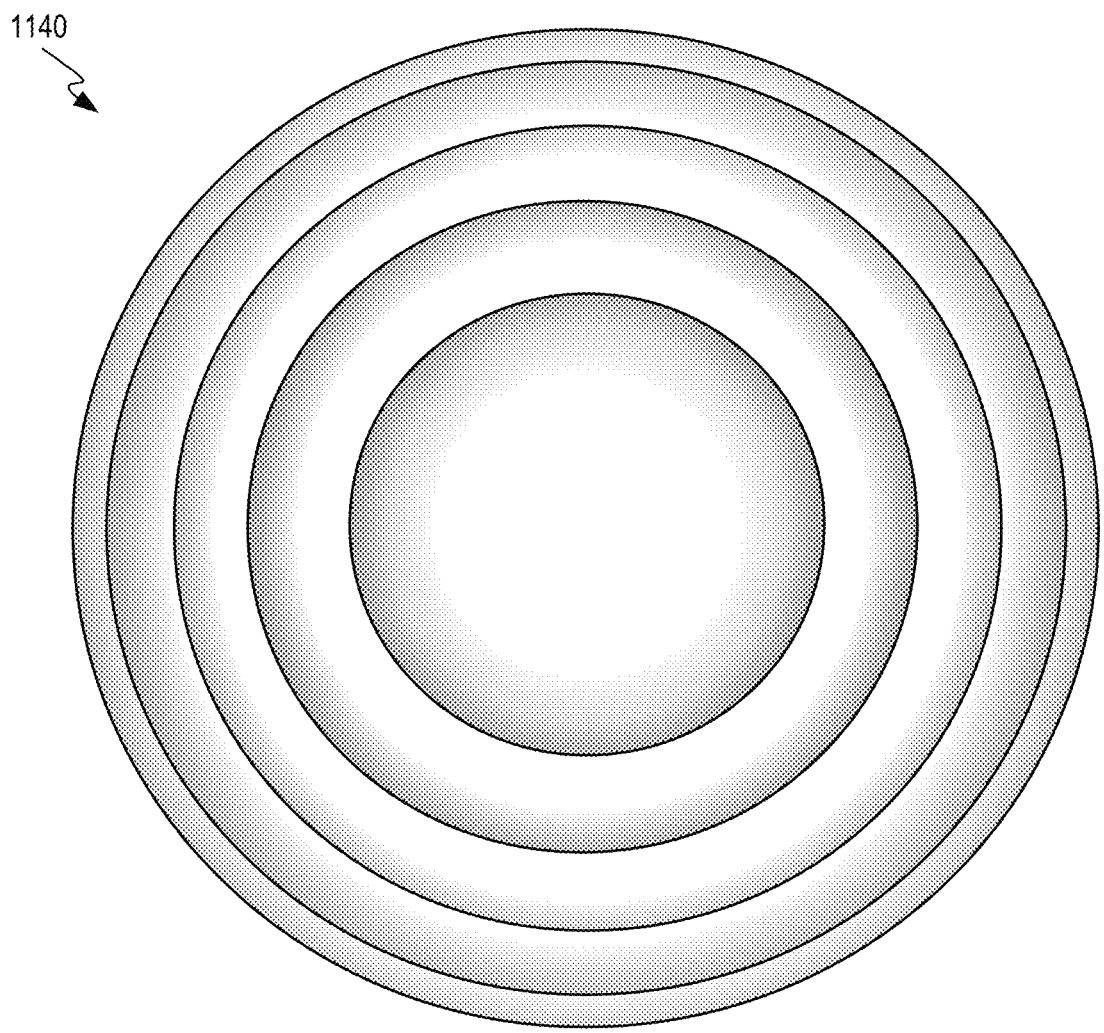

FIGS. 11C-11D show a cross-sectional side view and top view respectively of a liquid crystal lens 1140 having a Fresnel lens configuration. The Fresnel lens configuration can take the form of an optical steering device in order to magnify or de-magnify select virtual content. In particular, FIG. 11C depicts a Fresnel lens configuration configured to both change the magnification of and laterally shift light passing through liquid crystal lens 1140. This type of configuration could be incorporated into any of the optical steering devices described herein. In some embodiments, a user could request magnification of a particular region of the screen. In response, the optical steering device could be configured to form a Fresnel lens configuration over the particular region in order to magnify the content without having to change or update the light generating a particular image stream being viewed by the user.

Figure 12A:
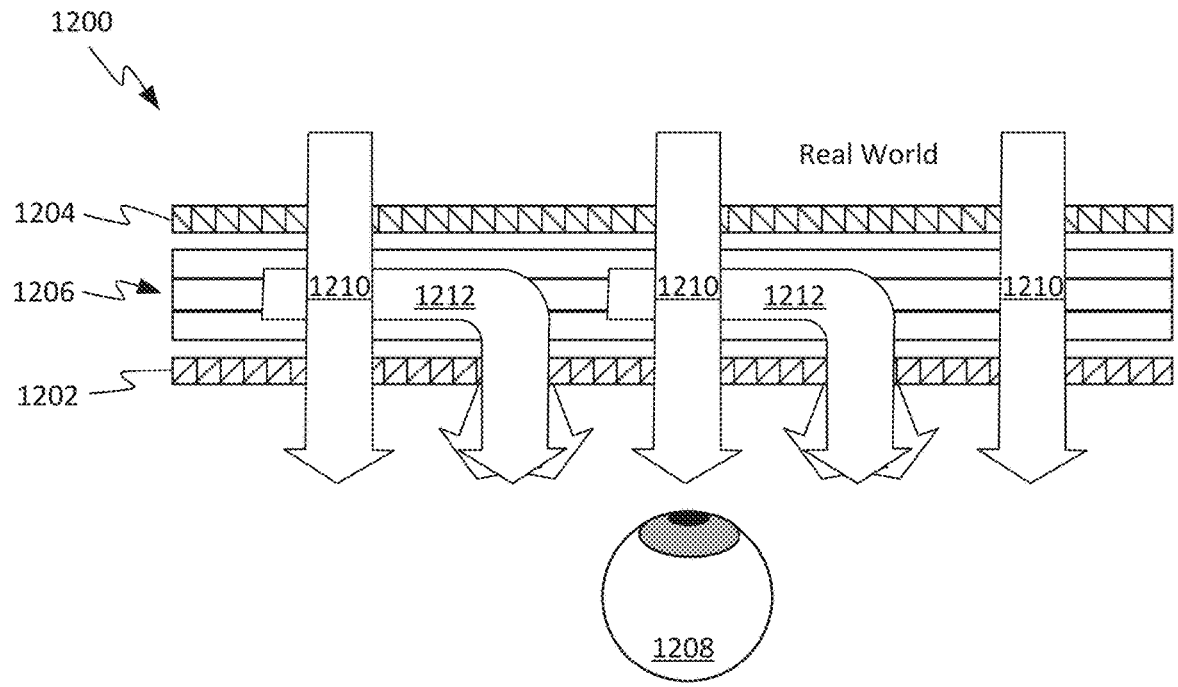
FIGS. 12A-12B show how optical steering devices can be incorporated into augmented reality display devices.
Figure 12B:
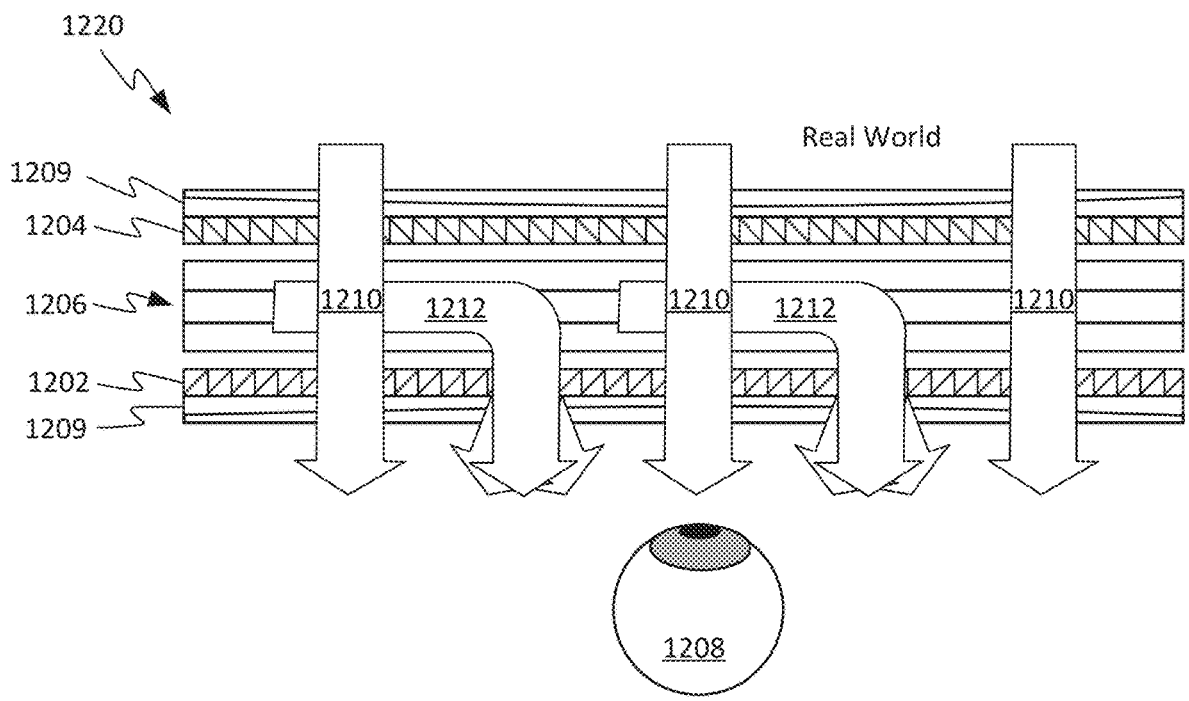

FIGS. 12A-12B show different ways in which optical steering devices can be incorporated into augmented reality display devices. In some embodiments, the optical steering devices can take the form of liquid crystal lenses capable of selectively changing refractive index in order to change the direction, perspective and/or magnification of light incident thereon. FIG. 12A shows a cross-sectional top view of display device 1200. Optical steering devices 1202 and 1204 are positioned on opposing sides of waveguide 1206 of display device 1200. Waveguide 1206 can include one or more discrete pathways for carrying different colors of light to an eye 1208 of a user of display device 1200. Optical steering devices 1202 and 1204 can have a substantially complementary configuration that allows for light 1210 reflected off real-world objects to pass through both optical steering devices to reach eye 1208 in a substantially undistorted manner. Light 1212 carried by waveguide 1206 can then be configured to visualize virtual content by undergoing beam steering in accordance with one or more scan patterns without adversely distorting light 1210. The scan patterns and sequential beam steering described previously, increase the effective field of view of display device 1200. FIG. 12B shows display device 1220 and how optical steering devices 1202 and 1204 can be incorporated with varifocal lenses 1209 so that both dynamic focus shift and field of view expansion can be applied to light 1212.

Figure 12C:
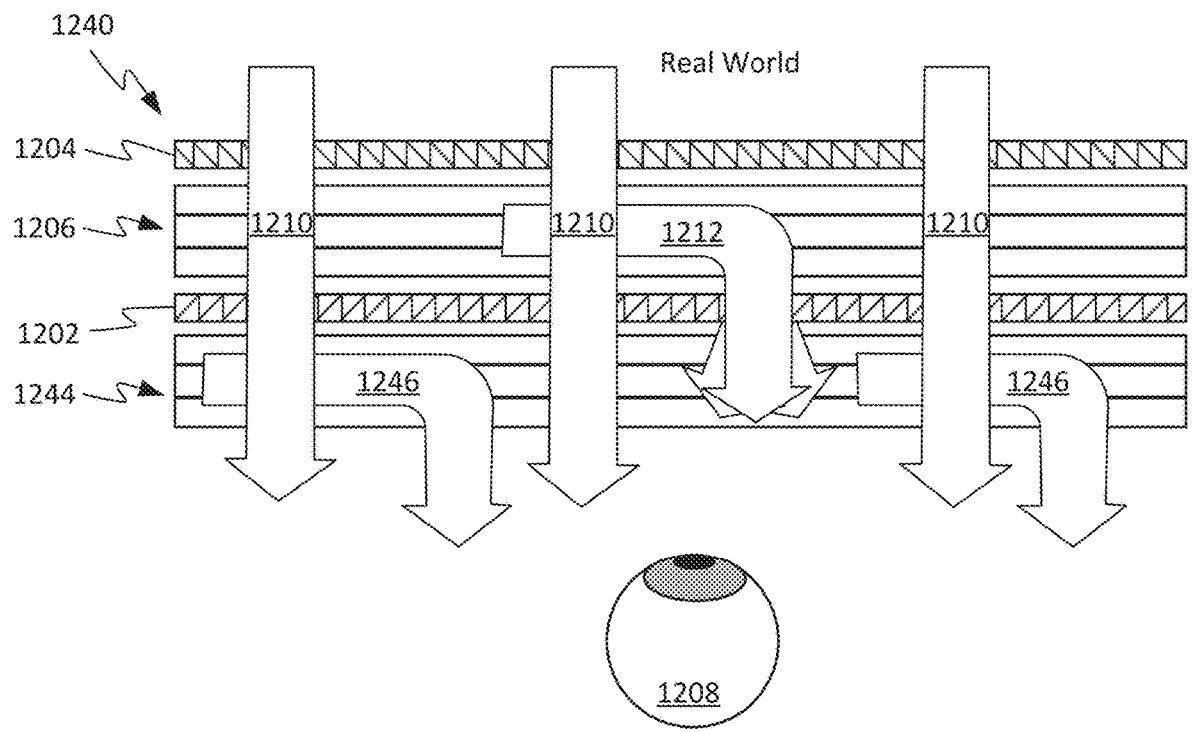
FIGS. 12C-12F show display devices configured to receive multiple image streams.

FIGS. 12C-12F show display devices configured to receive multiple image streams. FIG. 12C shows a top cross-sectional view of display device 1240 includes both waveguide 1206 and waveguide 1244. Waveguide 1244 can be configured to carry light 1246, which forms a wide field of view, low-resolution stream of images. As depicted, light 1246 does not undergo any scanning pattern prior to reaching eye 1208. Waveguide 1206 can be configured to carry light 1212, which forms a narrow field of view, high-resolution stream of images. Light 1212 entering waveguide 1244 can be configured to exit display device 1240 in a region where sensors indicate the user's eyes are focused. In this way, dynamic foveation of the narrow field of view, high-resolution stream of images can be achieved resulting in a user being given the impression that all of display device 1240 is emitting high-resolution imagery. Light 1212 can be projected across the surface of display device and optical steering device 1202 can dynamically steer light 1212 in a scan pattern that increases the effective field of view for the user. The resulting enlargement of the stream of images generated by light 1212 due to the scan pattern can help a region of a user's field of view capable of discerning the high-resolution to be fully covered by light 1212 even when the user is focusing on content near the edge of a display region of the display device. In this way, significant savings in hardware costs and processing power can be achieved because display 1240 need not display high-resolution imagery across a user's entire field of view.

Figure 12D:
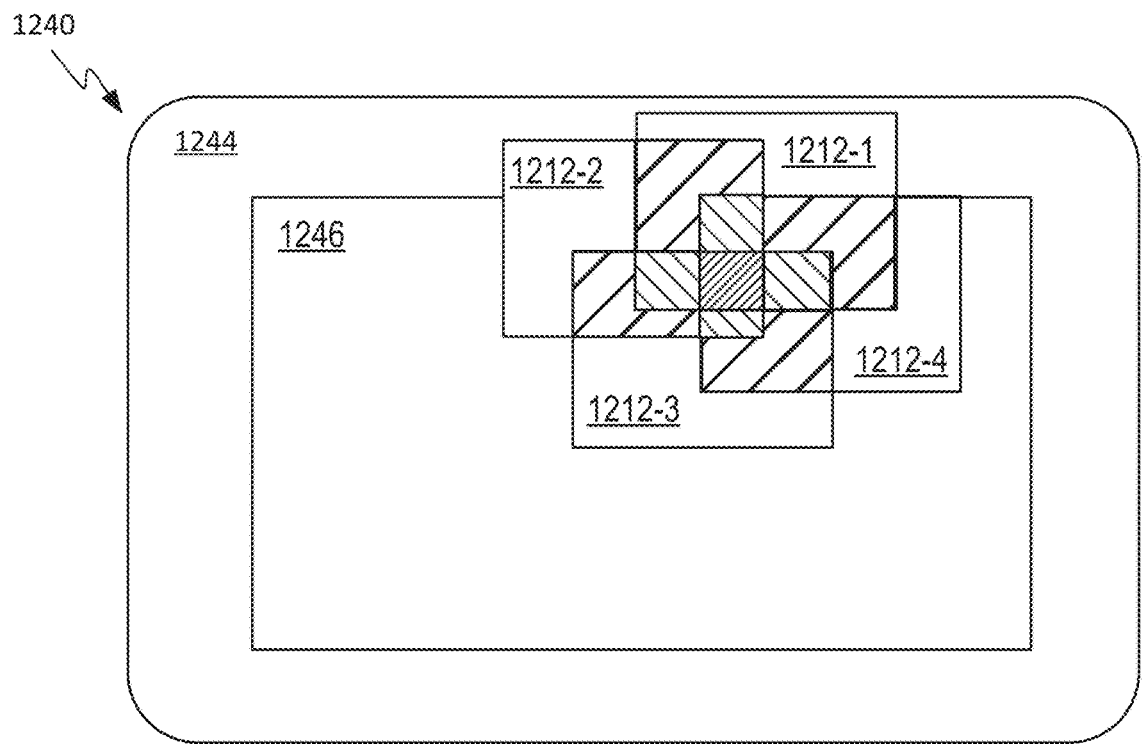

FIG. 12D shows a front view of display device 1240, as well as representations of imagery as perceived by the user as light 1212 and 1246 is projected onto the retina of the user's eye 1208. FIG. 12D shows a portion of waveguide 1244 capable of emitting light and a region of waveguide 1244 emitting light 1212. Light 1212 is depicted producing a narrow field of view image stream that shifts in a scan pattern. Light 1246 provides a wide field of view that remains stationary. In some embodiments, the area across which light 1246 extends represents the maximum viewable area across which light is viewable without an optical steering device. As depicted, a portion of light 1212 can extend outside the region covered by light 1246 on account of light 1212 benefiting from optical steering device 1202, which shifts light 1212 towards eye 1208.

Figure 12E:
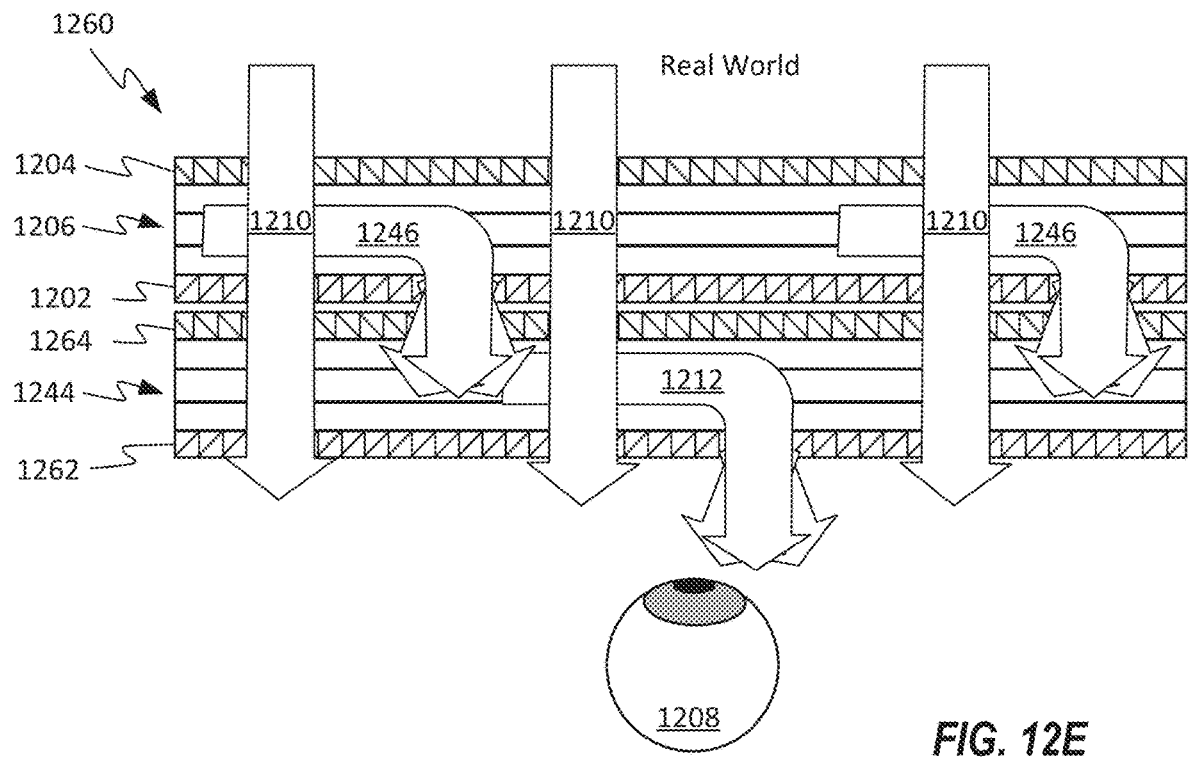

FIG. 12E shows display device 1260, which adds optical steering devices 1262 and 1264 to the configuration depicted in FIG. 12C. In this embodiment, light 1212, which generates narrow field of view, high-resolution imagery, can be directed through waveguide 1244 and light 1246, which generates wide field of view, low-resolution imagery, can be directed through waveguide 1206. Optical steering device 1262 is configured to independently steer light 1212. Optical steering device 1264 is configured to prevent light 1210 and light 1246 from being distorted by the steering of optical steering device 1262. Optical steering device 1264 can maintain a phase profile substantially complementary to the phase profile of optical steering device 1262. In this way, virtual content generated by light 1246 and 1212 can extend across expanded fields of view, thereby further improving the immersive experience for a user of display device 1260. It should be noted that in some embodiments, the functionality of optical steering devices 1202 and 1264 can be combined into a single optical steering device capable of assuming a phase profile that both shifts light 1246 in a desired scan pattern and preemptively compensates for any interference being generated by optical steering device 1262.

In some embodiments, light 1246 and 1212 generated by one or more projectors of display device 1260 can be configured to display streams of imagery at substantially the same spatial resolution. Optical steering devices 1202 and 1262 can then be configured to act independently to apply scan patterns to light 1212 and 1246 in order to maximize an effective field of view of display device 1260. The separation between waveguides 1206 and 1244 can be configured to generate different apparent distances between the user and virtual content generated by light 1212 and 1246. In this way, depth perception distances can be adjusted without a set of varifocal lenses, as shown in FIG. 12B. It should be noted that in some embodiments, waveguides at different distances and varifocal lenses can be used in combination to concurrently show virtual content at multiple different apparent distances from eye 1208. The varifocal lenses could then be used to change the apparent distance between eye 1208 and virtual content as previously described.

Figure 12F:
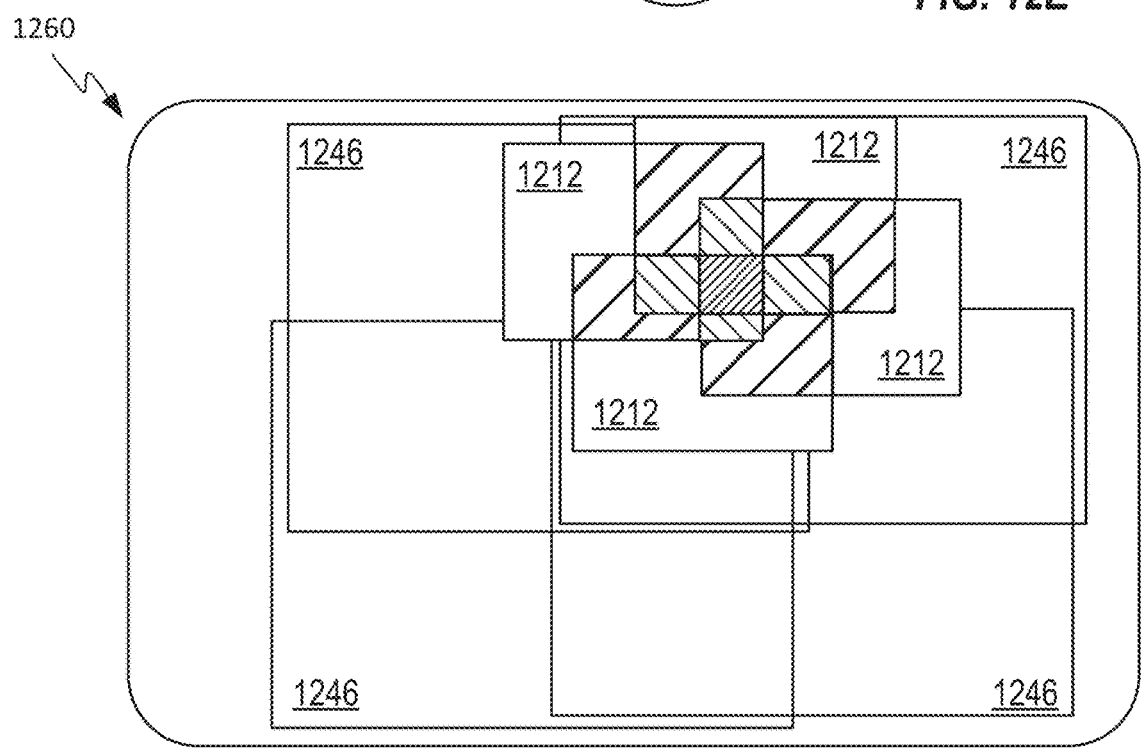

FIG. 12F shows a front view of display device 1260, as well as representations of imagery as perceived by the user as light 1212 and 1246 is projected onto the retina of the user's eye 1208. In particular, FIG. 12F shows how light 1212 can have a narrow field of view that shifts in a first scan pattern and how light 1246 can provide a wide field of view that shifts in a second scan pattern different than the first scan pattern. In some embodiments, the scan patterns can have the same size and/or resolution. Such a configuration could have the benefit of varying the apparent distance between the user and the virtual content.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data, which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. An augmented reality device, comprising:
   a first tunable lens characterized by a first lens curvature and a first lens depth;
   a second tunable lens characterized by a second lens curvature and a second lens depth;
   a waveguide positioned between the first tunable lens and the second tunable lens, the waveguide being configured to direct light representing virtual content through the first tunable lens and towards a user of the augmented reality device;
   a light source configured to emit the light representing the virtual content into the waveguide; and
   a processor configured to:
   cause the light source to emit the light in accordance with a scan pattern that results in the light being emitted through different peripheral regions of the first tunable lens; and
   direct the first tunable lens to shift at least a portion of the light received from the light source at one or more peripheral regions of the first tunable lens towards a central region between the different peripheral regions.

2. The augmented reality device of claim 1, wherein the first tunable lens and the second tunable lens are optical steering components.

3. The augmented reality device of claim 1, wherein the first tunable lens includes a plurality of regions, wherein each of the plurality of regions is characterized by a region lens curvature and a region depth, wherein the region lens curvature and the region depth of each region is adjusted differently so that a first portion of the virtual content can be displayed at a first apparent distance from the user and a second portion of the virtual content can be displayed at a second apparent distance from the user.

4. The augmented reality device of claim 1, wherein the waveguide comprises diffractive optics that reorient light received from a projector towards an eye of a user.

5. The augmented reality device of claim 1, wherein the first tunable lens and the second tunable lens are selected from the group consisting of diffractive lenses, fluidic lenses, mechanical lenses and electro-wetting lenses.

6. An augmented reality device, comprising:
   a first tunable lens characterized by an original lens curvature and an original lens depth;
   a second tunable lens;
   a waveguide positioned between the first tunable lens and the second tunable lens, the waveguide including diffractive optics configured to direct light representing virtual content through the first tunable lens and towards a user of the augmented reality device; and
   a light source configured to emit the light representing the virtual content into the waveguide, wherein the light source is configured to emit the light in accordance with a scan pattern that results in the light being emitted through different peripheral regions of the first tunable lens,
   wherein the first tunable lens is configured to shift at least a portion of the light received from the light source at one or more of the different peripheral regions of the first tunable lens towards a central region between the different peripheral regions.

7. The augmented reality device of claim 6, wherein light from real-world objects passes through both the first tunable lens and the second tunable lens as the first tunable lens and the second tunable lens cooperatively change shape.

8. The augmented reality device of claim 6, wherein the second tunable lens is configured to prevent the first tunable lens from distorting an appearance of real-world objects visible through the waveguide.

9. The augmented reality device of claim 6, wherein the first tunable lens and the second tunable lens are configured to correct the vision of the user of the augmented reality device.

10. The augmented reality device of claim 6, wherein the second tunable lens is also configured to obscure the view of real-world objects when trying to focus the user's attention on the virtual content.

11. The augmented reality device of claim 6, wherein the first tunable lens defines a first region for stationary virtual content at a first distance and a second region for moving virtual content at a second distance different than the first distance.

12. The augmented reality device of claim 1, wherein the first lens curvature is equal to the second lens curvature, wherein the first lens depth is equal to the second lens depth.

13. The augmented reality device of claim 6, wherein:
the first tunable lens is configured to change from the original lens curvature and the original lens depth to an adjusted lens curvature and an adjusted lens depth to adjust an apparent distance between a user of the augmented reality device and the virtual content;
with the original lens curvature and the original lens depth, the augmented reality device is characterized by an original apparent distance between the user of the augmented reality device and the virtual content for the first tunable lens;
the original lens curvature and the original lens depth are less than the adjusted lens curvature and the adjusted lens depth; and
the adjusted apparent distance between the user of the augmented reality device and the virtual content appears closer than the original apparent distance between the user of the augmented reality device and the virtual content for the first tunable lens.

14. The augmented reality device of claim 6, wherein the first tunable lens is configured to change from the original lens curvature and the original lens depth to an adjusted lens curvature and an adjusted lens depth to adjust an apparent distance between a user of the augmented reality device and the virtual content, wherein the adjusted lens curvature and the adjusted lens depth include multiple regions with different curvatures and depths so that a first portion of the virtual content can be displayed at a first apparent distance from the user and a second portion of the virtual content can be displayed at a second apparent distance from the user.

* * * * *